United States Patent
Torigoe et al.

(10) Patent No.: US 8,296,478 B2
(45) Date of Patent: Oct. 23, 2012

(54) DATA TRANSFER SYSTEM AND DATA TRANSFER METHOD

(75) Inventors: Osamu Torigoe, Odawara (JP); Tetsuya Kojima, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 81 days.

(21) Appl. No.: 12/811,500

(22) PCT Filed: Jun. 24, 2010

(86) PCT No.: PCT/JP2010/004208
§ 371 (c)(1),
(2), (4) Date: Jul. 1, 2010

(87) PCT Pub. No.: WO2011/161722
PCT Pub. Date: Dec. 29, 2011

(65) Prior Publication Data
US 2012/0036286 A1    Feb. 9, 2012

(51) Int. Cl.
G06F 3/00 (2006.01)
G06F 13/00 (2006.01)
(52) U.S. Cl. ......... 710/22; 710/2; 710/5; 710/8; 710/15; 710/32
(58) Field of Classification Search ................... None
See application file for complete search history.

(56) References Cited

U.S. PATENT DOCUMENTS
2005/0050244 A1   3/2005   Oda et al.
2006/0129901 A1   6/2006   Arataki et al.
2008/0222500 A1   9/2008   Tsukamoto et al.

FOREIGN PATENT DOCUMENTS
JP   08-077099    3/1996
JP   09-062610    7/1997
JP   2005-078596  3/2005

OTHER PUBLICATIONS

DMA Controller, 2007, Ingenic Semiconductor Co., [online, accessed on Dec. 16, 2011], URL: http://www.amebasystems.com/downloads/hardware/datasheets/ben-nanonote/Ingenic-SOC-JZ4720/Jz4740- PM/Jz4740_04_dmac_spec.pdf.*
PCT International Search Report and Written Opinion on application No. PCT/JP2010/004208 dated Mar. 24, 2011; 10 pages.

* cited by examiner

*Primary Examiner* — Scott Sun
(74) *Attorney, Agent, or Firm* — Foley & Lardner LLP

(57) ABSTRACT

An efficient transfer of data including a plurality of data sections is achieved. In a data transfer system including a first DMA 1142 of a channel control unit 11 and an MP 122 of a processor unit 12 that sets a transfer parameter in the first DMA 1142, while CKD format data 1400 is transferred from a cache memory 14 to a memory 113 of the channel control unit 11, the MP 122 acquires a C field 1411 from the cache memory 14 and sets a transfer parameter in the first DMA 1142 on the basis of the acquired C field 1411, the transfer parameter having attached thereto the C field 1411 and being used for transferring a K field 1412 from the cache memory 14 to the memory 113. The first DMA 1142 retrieves the C field 1411 attached to the transfer parameter, stores the C field 1411 in the memory 113, and transfers the K field from the cache memory 14 to the memory 113 according to the transfer parameter.

12 Claims, 19 Drawing Sheets

FIRST DMA TRANSFER PARAMETER 1800

SECOND DMA TRANSFER PARAMETER 1900

EXAMPLE OF FIRST DMA TRANSFER PARAMETER
(OR SECOND DMA TRANSFER PARAMETER)

EXAMPLE OF FIRST COMPLETION STATUS OR
SECOND COMPLETION STATUS

FIRST DMA TRANSFER PARAMETER 1800

EXAMPLE OF STORAGE OF CKD
FORMAT DATA INTO MEMORY 113

DATA TRANSFER SYSTEM AND DATA TRANSFER METHOD

TECHNICAL FIELD

The present invention relates to a data transfer system and a data transfer method, particularly to a technique for allowing an efficient transfer of data including a plurality of data sections such as CKD format data.

BACKGROUND ART

In relation to data transfer devices such as DMA (Direct Memory Access), various techniques have been proposed to improve data transfer efficiency. For example, Patent Literature (PTL) 1 discloses a DMA controller which alternately controls a first count control unit to control a transfer parameter for a first DMA transfer channel and a second count control unit to control a transfer parameter for a second DMA transfer channel. While a data transfer of a plurality of data blocks is in progress, the second count control unit loads from the memory a transfer parameter for the data block to be transferred subsequently, during an idle cycle in a data transfer by the first count control unit. In this way, the DMA controller disclosed in PTL 1 intends to eliminate the need for control by a CPU and to cancel a delay between a completion time of a data block transfer and an activation time of the subsequent data block transfer.

In addition, PTL 2 aims to reduce load on a CPU, and discloses that the need for interruption to a CPU, which may otherwise occur for each DMA transfer, is eliminated in such a manner that address information of a transfer parameter of a DMA in a main storage device is stored in an address register, and a transfer parameter is read according to the address information stored in the address register, and registered in a parameter register.

PTL 3 discloses a device provided with a first processor and a second processor and designed to achieve efficient use of the first processor and the second processor. In the device, the first processor writes into a memory data transfer information including information indicating a storage location in a first storage area and information indicating a storage location in a second storage area, and then the second processor reads the data transfer information from the memory, and transfers to the second storage area the data stored in the first storage area, according to the data transfer information. In this manner, the first processor is enabled to start execution of subsequent processing without waiting for a notification from the second processor.

CITATION LIST

Patent Literature
PTL 1: Japanese Patent Application Laid-open Publication No. 09-62610
PTL 2: Japanese Patent Application Laid-open Publication No. 08-77099
PTL 3: Japanese Patent Application Laid-open Publication No. 2005-78596

SUMMARY OF INVENTION

Technical Problem

FIG. 27 is an example of a hardware configuration of a storage apparatus 10, which serves as a data storage for a host computer 3 which is communicatively coupled to the storage apparatus 10. As shown in FIG. 27, the storage apparatus 10 includes a channel control unit 11, a processor unit 12, a cache memory 14, and an internal switch 16 which couples these components so as to allow them to communicate with each other.

The channel control unit 11 includes an external network I/F 111 to communicate with the host computer 3, an internal network I/F 114 to communicate with the processor unit 12 and the cache memory 14 via the internal switch 16, and a memory 113 which serves as a buffer for a data transfer between the external network I/F 111 and the internal network I/F 114. The external network I/F 111 includes a second DMA 1112, and the internal network I/F 114 includes a first DMA 1142.

FIG. 28 is a diagram explaining operations related to a data transfer performed in the storage apparatus 10, and more specifically, a flowchart illustrating the operations performed when the channel control unit 11 reads data stored in the cache memory 14 and transmits the read data to the host computer 3.

As shown in FIGS. 27 and 28, for the purpose of a data transfer, the processor unit 12 first sets a transfer parameter in the first DMA 1142 (S2711, S2811). The first DMA 1142 then starts the data transfer (starts a transfer of the data stored in the cache memory 14 to the memory 113) according to the transfer parameter thus set (S2712, S2812).

While the data transfer is in progress, the internal network I/F 114 monitors whether the data transfer by the first DMA 1142 is completed or not (S2813). When the data transfer is completed (S2813: YES), the internal network I/F 114 notifies the processor unit 12 of the completion status (S2713, S2814).

When being notified of the completion status from the internal network I/F 114, the processor unit 12 sets a transfer parameter in the second DMA 1112 (S2714, S2815). Thereby, the second DMA 1112 starts data transfer (a transfer of the data stored in the memory 113 to the host computer 3) according to the transfer parameter (S2715, S2816).

While the data transfer is in progress, the external network I/F 111 monitors whether the data transfer by the second DMA 1112 is completed or not (S2817). When the data transfer is completed (S2817: YES), the external network I/F 111 notifies the processor unit 12 of the completion status (S2716, S2818).

In a case where the host computer 3 is an apparatus such as a mainframe which manages data in a variable length format while the storage apparatus 10 manages data in a so-called CKD (Count Key Data architecture) format, a series of processing steps performed by the first DMA 1142 to make the data transfer from the cache memory 14 to the memory 113 (processing from S2711 to S2713 in FIG. 27 or processing from S2811 to S2814 in FIG. 28) are performed based on the assumption that the data to be transferred is data in the CKD format.

FIG. 29 is a flowchart explaining the above-mentioned series of processing steps in detail. As shown in FIG. 29, an MP 122 of the processor unit 12 first reads a C field of the CKD format data stored in the cache memory 14 (S2910).

The MP 122 then sets a transfer parameter in the first DMA 1142 for a transfer of the C field from the cache memory 14 to the memory 113 (S2911).

When a setting of the transfer parameter is completed, the first DMA 1142 performs a data transfer of the C field data (S2912). At this point, the first DMA 1142 also calculates an assurance code for the C field and stores a value of the calculated code therein (S2913).

When the data transfer is completed, the first DMA 1142 writes a completion status of the data transfer of the C field, to an LM 123 of the MP 122 (S2914).

Referring to the C field (data including a data length of a K field, and the like) read in S2910, the MP 122 then sets a transfer parameter in the first DMA 1142 for a transfer of the K field from the cache memory 14 to the memory 113 (S2915).

When a setting of the transfer parameter is completed, the first DMA 1142 performs a data transfer of the K field data (S2916). At this point, the first DMA 1142 also calculates an assurance code for the K field on the basis of the value stored in S2913 (by taking over the value stored in S2913) and stores a value of the calculated code therein (S2917).

When the data transfer is completed, the first DMA 1142 writes a completion status of the data transfer of the K field, to the LM 123 of the MP 122 (S2918).

Referring to the C field (data including a data length of a D field, or the like) read in S2910, the MP 122 then sets a transfer parameter in the first DMA 1142 for a transfer of the D field from the cache memory 14 to the memory 113 (S2919).

When a setting of the transfer parameter is completed, the first DMA 1142 performs a data transfer of the D field data (S2920). At this point, the first DMA 1142 also calculates an assurance code for the D field on the basis of the value kept in S2917 (by taking over the value kept in S2917) (S2921).

When the data transfer is completed, the first DMA 1142 stores the calculated assurance code (the assurance code for the entire CKD format data) to the memory 113 (S2922) and writes a completion status of the data transfer of the D field, into the LM 123 of the MP 122 (S2923).

In the above processing, the MP 122 sets a transfer parameter in the first DMA 1142 by communicating with the first DMA 1142 via the internal switch 16. When the communications are made via the internal switch 16 in the above described manner, there is a need to establish communications dedicatedly between the MP 122 and the internal switch 16, and between the internal switch 16 and the first DMA 1142. This need for the communications establishment may cause the storage apparatus 10 to have a poorer processing performance (e.g., the throughput and the response performance to the host computer 3).

Also, as shown in FIG. 29, when the data to be transferred is data in CKD format, an assurance code for the entire CKD format data is required to be generated. For this reason, the transfer parameters for the C field, K field, and D field are required to be set in turn in the same data transfer device (the first DMA 1142). This requirement is a negative factor for increasing the processing performance of the storage apparatus 10.

Nowadays, the structure of the storage apparatus 10 has become more complicated due to its upsizing and higher redundancy, and the entity which activates a data transfer (the processor unit 12) and another entity which is activated (the first DMA 1142) have an increasingly longer communication distance between them. Thus, the deterioration in the performance of the storage apparatus 10 due to the above-mentioned reasons is not always negligible any more.

The present invention has been made in view of such background, and it is an object thereof to provide a data transfer system and a data transfer method capable of allowing an efficient data transfer.

Solution to Problem

An aspect of the present invention to achieve the above object is a data transfer system comprising: a first data transfer device communicatively coupled to a transfer source device and a transfer destination device; and a transfer parameter setting device which sets a transfer parameter in the first data transfer device: wherein at a time the transfer parameter setting device transfers a transfer target data including a first data section and at least one second data section from the transfer source device to the transfer destination device, the first data section containing information used for setting the transfer parameter of the second data section, the transfer parameter setting device acquires the first data section from the transfer source device, and sets a transfer parameter in the first data transfer device on the basis of the acquired first data section, the transfer parameter having attached thereto the first data section and being for transferring the second data section from the transfer source device to the transfer destination device, and the first data transfer device stores the first data section attached to the transfer parameter, in the transfer destination device, and transfers the transfer target data from the transfer source device to the transfer destination device by transferring the second data section from the transfer source device to the transfer destination device according to the transfer parameter.

Other problems and solutions therefore disclosed herein will become apparent from the description in the Description of Embodiments with reference to the drawings.

Advantageous Effects of Invention

The present invention allows an efficient transfer of data including a plurality of data sections such as CKD format data.

DESCRIPTION OF EMBODIMENTS

In the following, the embodiments are described in conjunction with the drawings.

First Embodiment

Figure 1:
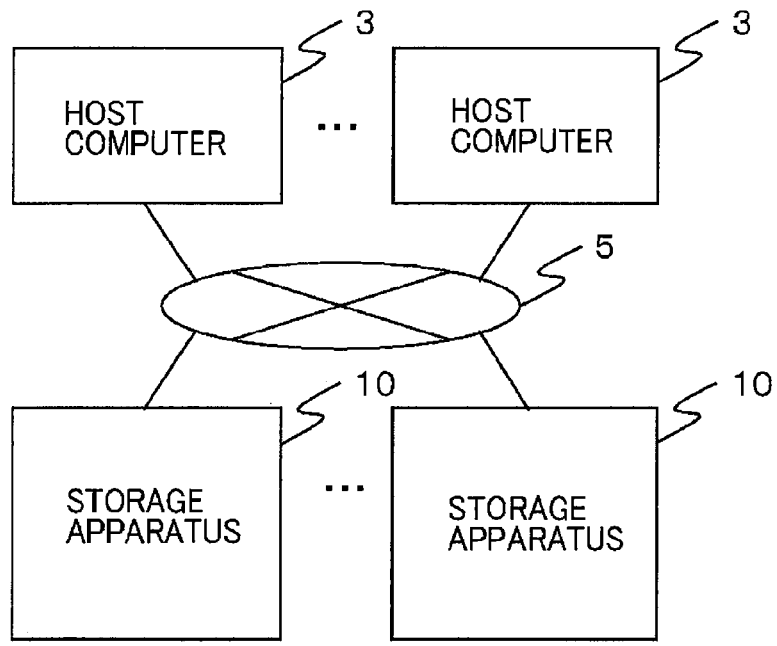
FIG. 1 is a diagram showing a schematic configuration of an information processing system 1.

FIG. 1 shows a schematic configuration of an information processing system 1 described as a first embodiment. As shown in FIG. 1, the information processing system 1 is configured by including at least one host computer 3 (external device), and at least one storage apparatus 10.

The host computer 3 is, for example, a computer which provides a service such as automated teller service of a bank, or Web page browsing service on the Internet. The storage apparatus 10 provides a data storage area to an application program, or the like, executed in the host computer 3.

The host computer 3 and the storage apparatus 10 are communicatively coupled to each other via a storage network 5. The storage network 5 is, for example, a LAN (Local Area Network), WAN (Wide Area Network), SAN (Storage Area Network), the Internet, a public line, a private line, and the like. Communication via the storage network 5 is performed in accordance with a protocol, such as, for example, TCP/IP, iSCSI (internet Small Computer System Interface), the Fibre Channel Protocol, FICON (Fibre Connection) (registered trademark), ESCON (Enterprise System Connection) (registered trademark), ACONARC (Advanced Connection Architecture) (registered trademark), and FIBARC (Fibre Connection Architecture) (registered trademark).

The hardware of the host computer 3 is, for example, a personal computer, a Mainframe, an office computer, and the like. The host computer 3 transmits to the storage apparatus 10 a data frame (hereinafter abbreviated as a frame) including a data I/O request (such as a data write request, or a data read request) when accessing the above-mentioned storage area provided by the storage apparatus 10. The frame is, for example, Fibre Channel frame (FC frame).

Figure 2:
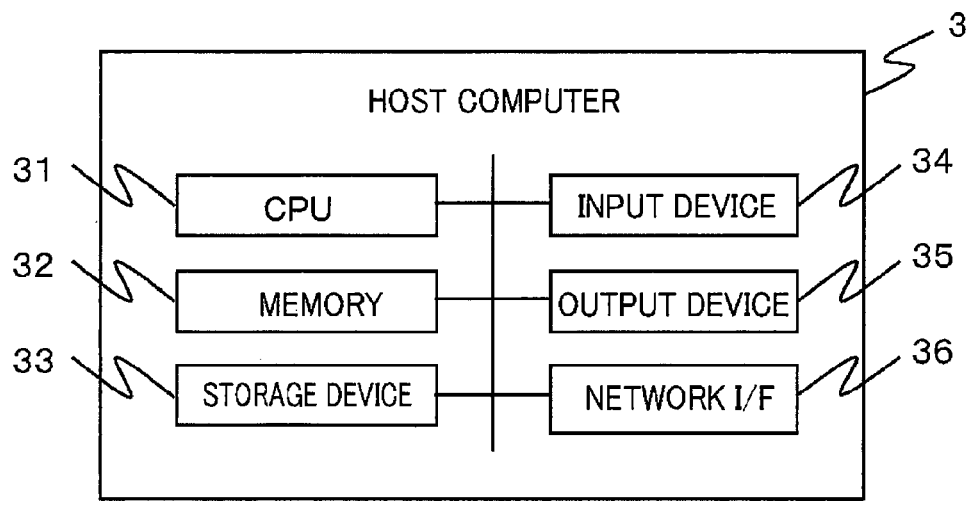
FIG. 2 is a diagram showing a hardware configuration of a host computer 3.

FIG. 2 shows an example of hardware of an information processing device (computer) which is utilized as a host computer 3. As shown in FIG. 2, the information processing device includes a CPU 31, a volatile or non-volatile memory 32 (RAM or ROM), a storage device 33 (for example, an HDD (Hard Disk Drive) or a semi-conductor storage device (or, SSD (Solid State Drive))), an input device 34 such as a keyboard or a mouse, an output device 35 such as a liquid crystal monitor or a printer, and a network interface (hereinafter referred to as a network I/F 36) such as an NIC (Network Interface Card) or an HBA (Host Bus Adapter).

Figure 3:
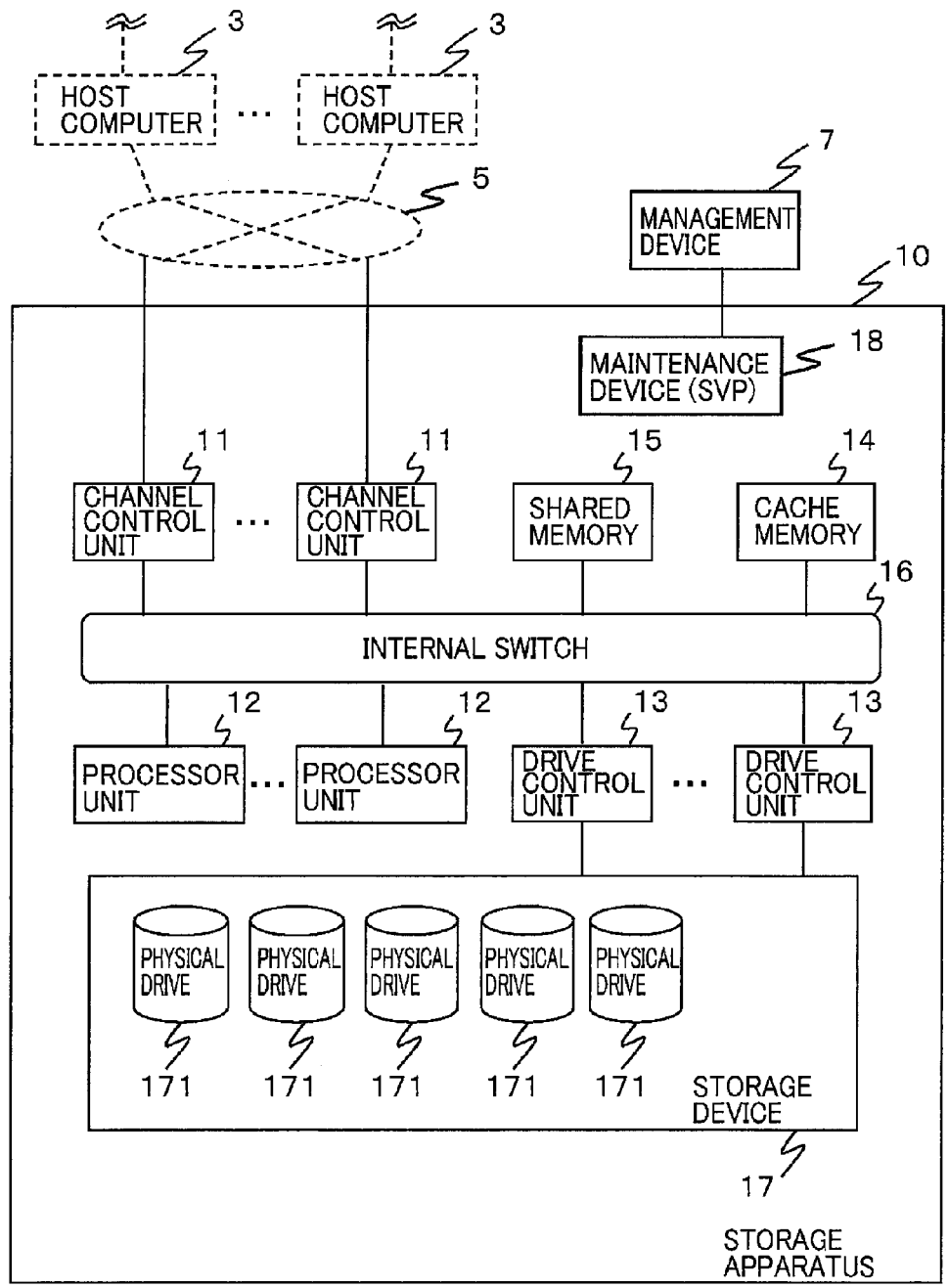
FIG. 3 is a diagram showing a hardware configuration of a storage apparatus 10.

FIG. 3 shows an example of a hardware configuration of the storage apparatus 10. The storage apparatus 10 is, for example, a disk array device. As shown in FIG. 3, the storage apparatus 10 includes at least one channel control unit 11, at least one processor unit 12 (Micro Processor), at least one drive control unit 13, a cache memory 14, a shared memory 15, an internal switch 16, a storage device 17, and a maintenance device 18 (SVP: SerVice Processor). The channel control unit 11, the processor unit 12, the drive control unit 13, the cache memory 14, and the shared memory 15 are communicatively coupled to each other via the internal switch 16.

Among these components, the channel control unit 11 receives a frame transmitted from the host computer 3, and transmits to the host computer 3 a frame including a response to processing requested by a data I/O request included in the received frame (for example, read data, a read completion report, or a write completion report).

In response to the above-mentioned data I/O request included in the frame received by the channel control unit 11, the processor unit 12 performs processing related to a data transfer made between the channel control unit 11, the drive control unit 13, and the cache memory 14. The processor unit 12 performs processing such as passing of data (data read from the storage device 17 and data to be written into the storage device 17) between the channel control unit 11 and the drive control unit 13 via the cache memory 14, staging (reading data from the storage device 17) or destaging (writing data of the cache memory 14, into the storage device 17) of data stored in the cache memory 14.

The cache memory 14 is configured with, for example, a RAM (Random Access Memory) capable of high-speed access. The cache memory 14 stores therein data to be written into the storage device 17 (hereinafter referred to as write data), data read from the storage device 17 (hereinafter referred to as read data), and the like.

The shared memory 15 stores therein various types of information used for controlling the storage apparatus 10.

The drive control unit 13 communicates with the storage device 17 at the time of reading data from the storage device 17 and writing data into the storage device 17.

The internal switch 16 is configured, for example, with a high-speed crossbar switch. Communication via the internal switch 16 is performed in accordance with a protocol such as a Fibre Channel, iSCSI, or TCP/IP.

The storage device 17 is configured by including a plurality of physical drives 171 each being a physical recordable medium. The physical drive 171 is configured with a hard disk drive of a type such as SAS (Serial Attached SCSI), SATA (Serial ATA), FC (Fibre Channel), PATA (Parallel ATA), or SCSI, or with hardware such as semi-conductor storage device (SSD). Note that the storage device 17 may be stored in the same housing as the one for the storage apparatus 10, or may be stored in a housing different from the one for the storage apparatus 10.

Figure 4:
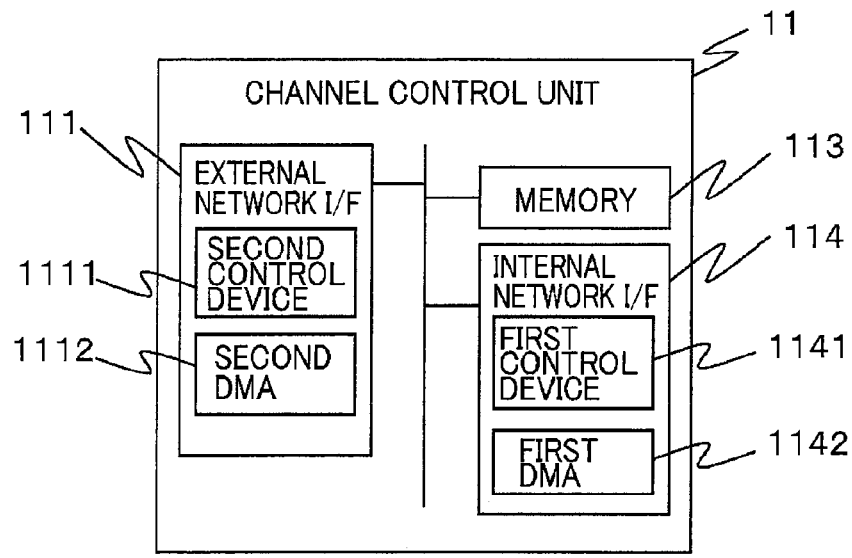
FIG. 4 is a diagram showing a hardware configuration of a channel control unit 11.

FIG. 4 shows a hardware configuration of the channel control unit 11. As shown in FIG. 4, the channel control unit 11 includes an external network interface having at least one port (network port) for communication with the host computer 3 (hereinafter referred to as an external network I/F 111 (a second data transfer device)), a memory 113, and an internal network interface having a port (network port) for communication with the processor unit 12 (hereinafter referred to as an internal network I/F 114).

The external network I/F 111 communicates with the host computer 3 via the storage network 5 in accordance with a communication code (communication protocol) used for the communication in the storage network 5. As shown in FIG. 4, the external network I/F 111 includes a control device configured with a semiconductor device (or a semiconductor integrated circuit) such as a CPU (Central Processing Unit), an MPU (Micro Processing Unit), or an ASIC (Application Specific Integrated Circuit) (hereinafter the control device is referred to as a second control device 1111), and a DMA (Direct Memory Access) (hereinafter the DMA is referred to as a second DMA 1112 (or a second data transfer device)). The second DMA 1112 may be incorporated in the second control device 1111, or may be a separated body (separated package) from the second control device 1111.

The second control device 1111 communicates with the host computer 3 and the internal network I/F 114. The second control device 1111 controls the second DMA 1112 and thus transfers data stored in the memory 113 to the host computer 3. On the other hand, the second control device 1111 controls the second DMA 1112 and thus stores the data transmitted from the host computer 3 into the memory 113.

The internal network I/F 114 communicates with the processor unit 12, the drive control unit 13, the cache memory 14, and the shared memory 15 via the internal switch 16. As shown in FIG. 4, the internal network I/F 114 includes a control device configured with a semiconductor device (or a semiconductor integrated circuit) such as a CPU, an MPU, or an ASIC (hereinafter the control device is referred to as a first control device 1141), and a DMA (hereinafter the DMA is referred to as a first DMA 1142 (or a first data transfer device)). The first DMA 1142 may be incorporated in the first control device 1141, or may be a separated body (separated package) from the first control device 1141.

The first control device 1141 controls the first DMA 1142 and thus transfers to the cache memory 14 data stored in the memory 113. Also, the first control device 1141 controls the first DMA 1142 and thus transfers to the memory 113 the data stored in the cache memory 14.

The memory 113 includes a ROM (Read Only Memory) and a RAM (Random Access Memory). The memory 113 provides a temporary storage area (data buffer) for data at the time of a data transfer between the external network I/F 111 and the internal network I/F 114, as well as a data transfer between the internal network I/F 114 and the cache memory 14. The memory 113 stores therein a micro program. By the external network I/F 111 or the internal network I/F 114 reading micro programs from the memory 113 and executing the micro programs thus read, various types of functions provided by the channel control unit 11 are implemented.

Figure 5:
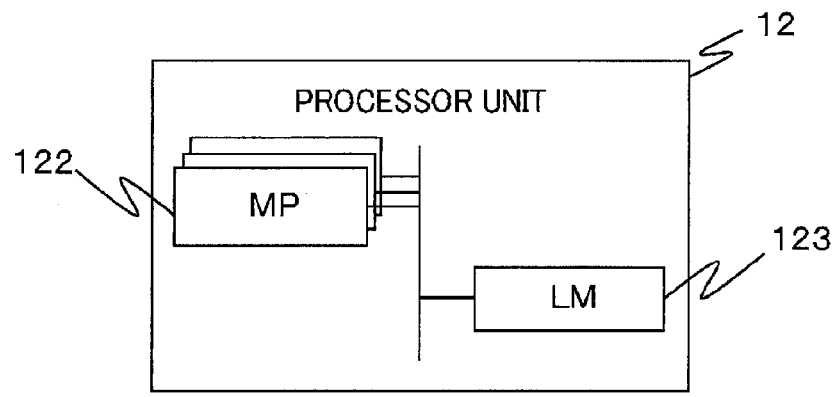
FIG. 5 is a diagram showing a hardware configuration of a processor unit 12.

FIG. 5 shows a hardware configuration of the processor unit 12. The processor unit 12 includes at least one microprocessor (hereinafter referred to as an MP 122 (transfer parameter setting device)), and a local memory 123 (hereinafter referred to as an LM 123). The MP 122 is configured with a CPU, an MPU, an ASIC, and the like. The LM 123 stores therein a microprogram. By the MP 122 reading the above-mentioned microprogram from the LM 123 and executing the same, various types of functions provided by the processor unit 12 are implemented.

The MP 122 and the LM 123 are provided in various aspects so as to have, for example, a many-to-one relationship (for example, in a case where a plurality of MPs 122 utilize a common LM 123), or a many-to-many relationship (for example, in a case where each MP 122 is provided with a different LM 123) according to the type of the storage apparatus 10.

Figure 6:
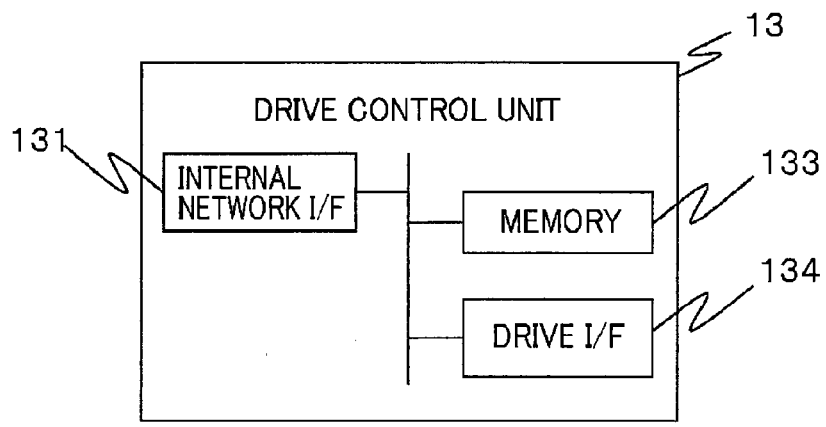
FIG. 6 is a diagram showing a hardware configuration of a drive control unit 13.

FIG. 6 shows a hardware configuration of the drive control unit 13. The drive control unit 13 includes an internal network interface (hereinafter referred to as an internal network I/F 131), a memory 133, and a drive interface (hereinafter referred to as a drive I/F 134).

The internal network I/F 131 includes a DMA and a arithmetic and control unit configured with a CPU, an MPU, an ASIC, or the like. The DMA may be incorporated in the arithmetic and control unit, or may be a separated body (separated package) from the arithmetic and control unit. The internal network I/F 131 communicates with the channel control unit 11, the processor unit 12, the cache memory 14, and the shared memory 15 via the internal switch 16.

The drive I/F 134 communicates with the storage device 17 in accordance with a predetermined communication method.

The memory 133 includes a ROM and a RAM. The memory 133 provides a temporary storage area for data (data buffer) at the time of a data transfer between the internal network I/F 131 and the drive I/F 134, as well as a data transfer between the internal network I/F 131 and the cache memory 14. The memory 133 stores therein a micro program. By the internal network I/F 131 or the drive I/F 134 reading the micro program from the memory 133 and executing the micro program thus read, various types of functions provided by the drive control unit 13 are implemented.

A maintenance device 18 shown in FIG. 3 controls the components of the storage apparatus 10 and monitors the states of the components. The maintenance device 18 is a personal computer, an office computer, and the like. The maintenance device 18 communicates as needed, via the internal switch 16 or communication means such as LAN, with the components of the storage apparatus 10 such as the channel control unit 11, the processor unit 12, the drive control unit 13, the cache memory 14, the shared memory 15, and the internal switch 16, to acquire operation information and the like from the components, and provides them to the management device 7. Furthermore, the maintenance device 18 sets, controls, and maintains the components (including installing and updating software) in accordance with the control information and operation information transmitted from the management device 7.

The management device 7 is a computer communicatively coupled to the maintenance device 18 via a LAN and the like. The management device 7 includes a user interface that uses a GUI (Graphic User Interface), CLI (Command Line Interface), and the like to control and monitor the storage apparatus 10.

Figure 7:
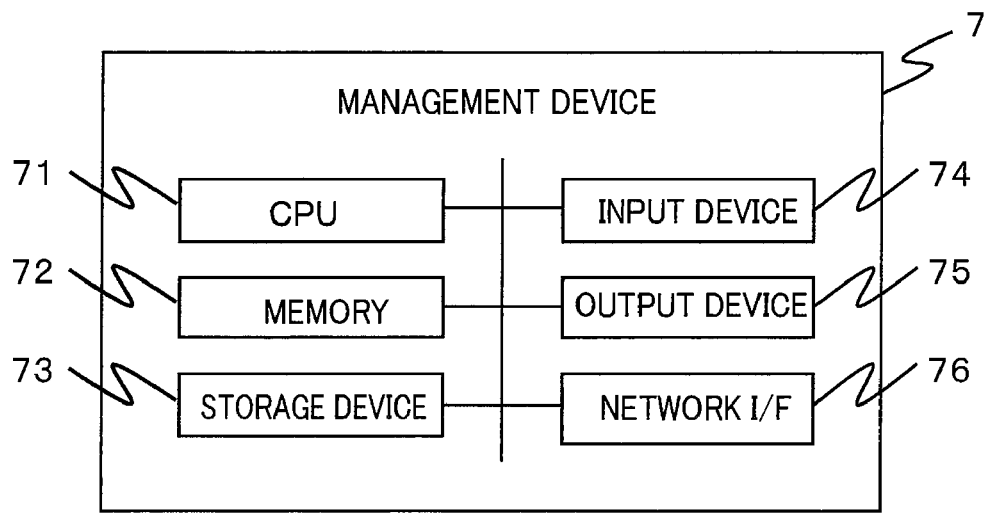
FIG. 7 is a diagram showing a hardware configuration of a management device 7.

FIG. 7 shows an example of hardware of an information processing device (computer) which can be utilized as a management device 7. As shown in FIG. 7, this device includes a CPU 71, a volatile or non-volatile memory 72 (RAM or ROM), a storage device 73 (for example, an HDD (Hard Disk Drive) or a semiconductor storage device (or, SSD (Solid State Drive))), an input device 74 such as a keyboard or a mouse, an output device 75 such as a liquid crystal monitor or a printer, and a network interface (a network I/F 76) to communicate with the maintenance device 18.

Figure 8:
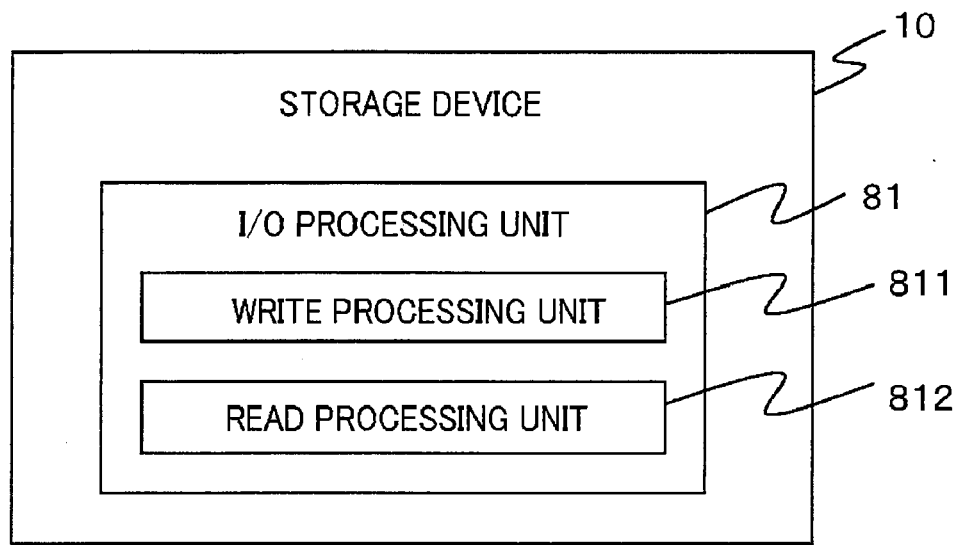
FIG. 8 is a diagram showing main functions of the storage apparatus 10.

FIG. 8 shows basic functions of the storage apparatus 10. As shown in FIG. 8, the storage apparatus 10 includes an I/O processing unit 81. The I/O processing unit 81 includes a write processing unit 811 that performs processing related to writing data into the storage device 17, and a read processing unit 812 that performs processing related to reading data from the storage device 17.

Figure 9:
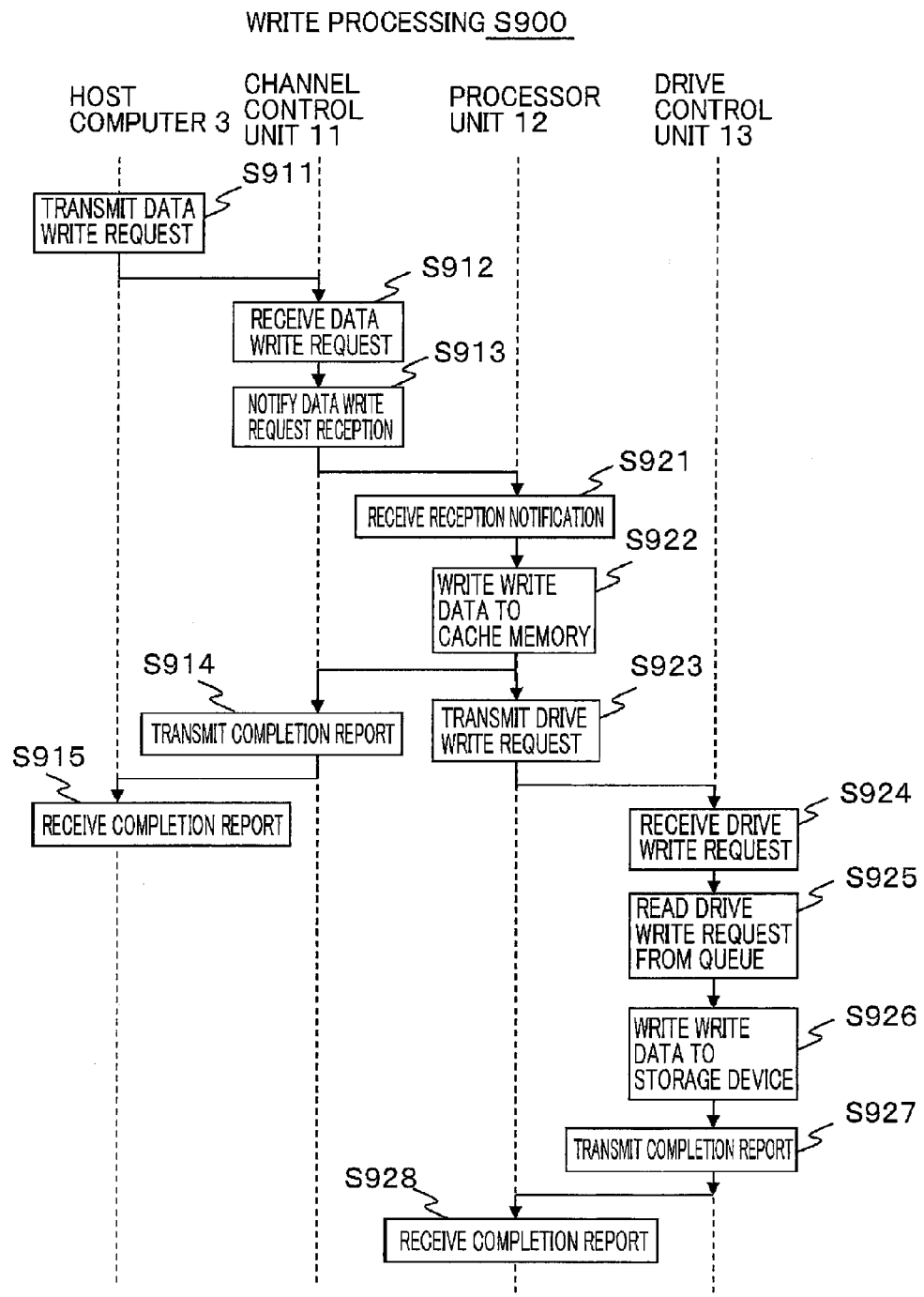
FIG. 9 is a flowchart explaining data write processing S900.

FIG. 9 is a flowchart explaining basic processing (hereinafter referred to as write processing S900) which is performed by the write processing unit 811 of the I/O processing unit 81 when the storage apparatus 10 receives a frame including a data write request from the host computer 3. In the following, the write processing S900 is described in conjunction with FIG. 9. Note that, in the description below, the character "S" prefixed to each reference numeral indicates step.

A frame including a data write request transmitted from the host computer 3 is received by the channel control unit 11 of the storage apparatus 10 (S911, S912). Upon receipt of the frame, the channel control unit 11 notifies the processor unit 12 of the frame receipt (S913).

Upon receipt of the above-mentioned notification from the channel control unit 11 (S921), the processor unit 12 generates a drive write request on the basis of the data write request of the relevant frame, and stores the write data into the cache memory 14. The processor unit 12 then transmits the generated drive write request to the drive control unit 13 (S922, S923). The channel control unit 11 transmits a completion report to the host computer 3 (S914), and the host computer 3 receives the completion report (S915).

Upon receipt of the drive write request, the drive control unit 13 registers the drive write request to a write processing queue (S924). The drive control unit 13 reads the drive write request from the write processing queue as needed (S925). The drive control unit 13 reads from the cache memory 14 the write data specified by the read drive write request, and writes the read write data into a physical drive 171 (S926).

The drive control unit 13 then transmits to the processor unit 12 a report that writing of the write data requested by the drive write request has been completed (completion report) (S927), and the processor unit 12 receives the transmitted completion report (S928).

Figure 10:
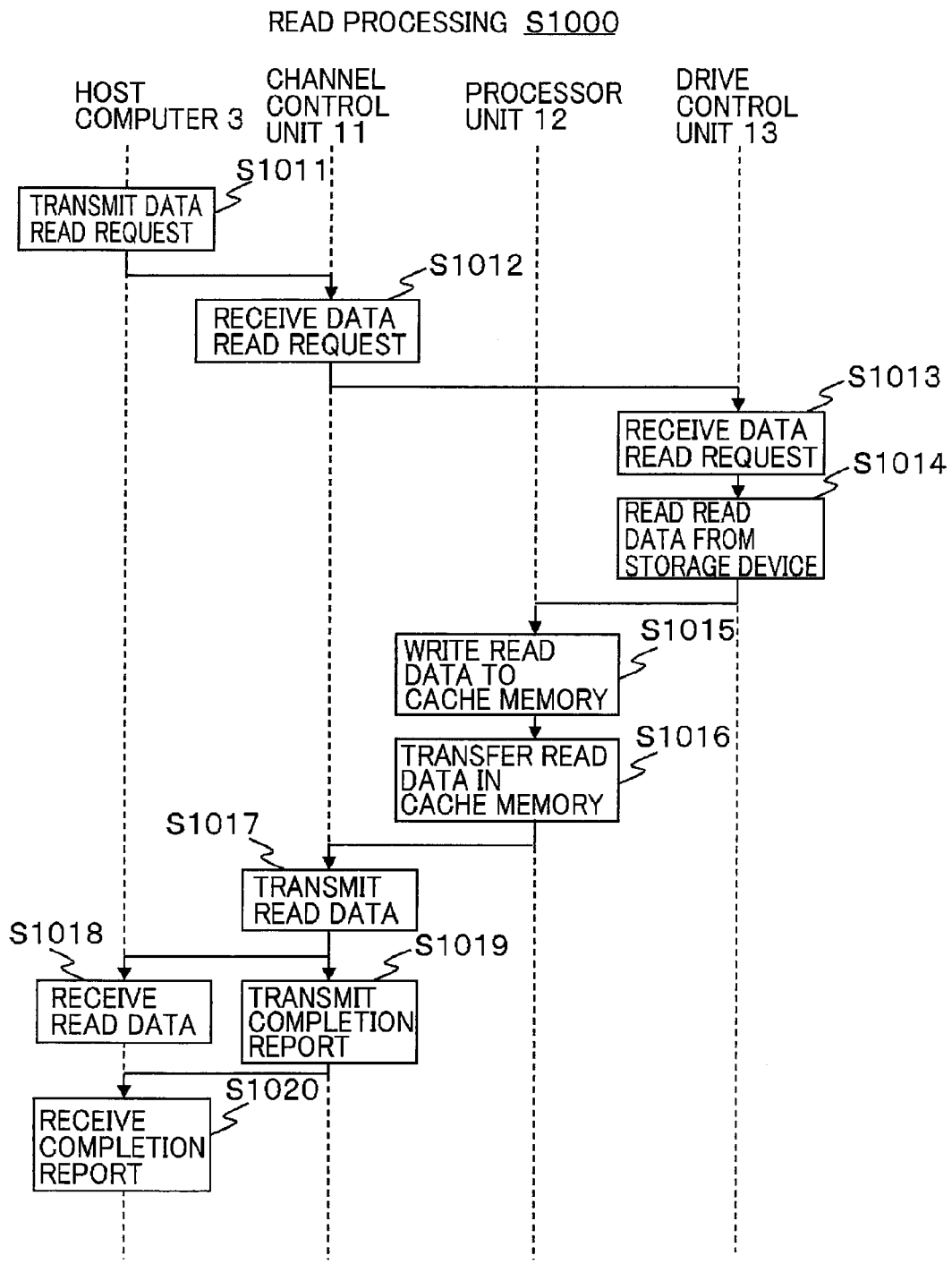
FIG. 10 is a flowchart explaining data read processing S1000.

FIG. 10 is a flowchart explaining I/O processing (hereinafter referred to as read processing S1000) which is performed by the read processing unit 812 of the I/O processing unit 81 in the storage apparatus 10 when the storage apparatus 10 receives a frame including a data read request from the host computer 3. In the following, the read processing S1000 is described in conjunction with FIG. 10.

A frame transmitted from the host computer 3 is received by the channel control unit 11 in the storage apparatus 10 (S1011, S1012). Upon receipt of the frame from the host computer 3, the channel control unit 11 notifies the drive control unit 13 of the frame receipt.

Upon receipt of the above-mentioned notification from the channel control unit 11 (S1013), the drive control unit 13 reads, from the storage device 17 (the physical drive 171), data specified by a data read request included in the received frame (for example, specified by an LBA (Logical Block Address)) (S1014). Note that the read processing from the storage device 17 (S1014) is omitted if there is any read data in the cache memory 14 (in a case of a cache hit). The processor unit 12 writes the data read by the drive control unit 13 into the cache memory 14 (S1015). The processor unit 12 transfers the data written into the cache memory 14 to the network I/F as needed (S1016).

The channel control unit 11 sequentially transmits to the host computer 3 the read data transmitted from the processor unit 12 (S1017, S1018). When the transmission of the read data is completed, the channel control unit 11 transmits a completion report to the host computer 3 (S1019), and the host computer 3 receives the transmitted completion report (S1020).

A network port included in the network I/F 36 of the host computer 3 (hereinafter referred to as a host port) is assigned a port ID (for example, a WWN (World Wide Name)) which is identification information to identify a device coupled to the storage network 5. The port ID is assigned to each of the network ports included in the network I/F 36. Thus, the network I/F 36 having a plurality of network ports for coupling to the storage network 5, for example, are assigned different port IDs for those network ports.

On the other hand, a network port provided for the channel control unit 11 of the storage apparatus 10 to couple to the storage network 5 (hereinafter referred to as a storage port) is also assigned a port ID (for example, a WWN or an MAC address).

Hereinafter, the port ID assigned to the network I/F 36 of the host computer 3 is referred to as the host port ID, and a port ID assigned to each network port included in the channel control unit 11 is referred to as a channel port ID.

The storage apparatus 10 provides the host computer 3 with a storage area of the physical drive 171 on a logical unit (LU) basis. The logical unit is a logical storage area configured by allocating the storage area of the physical drive 171 in a predetermined allocation unit (hereinafter referred to as a physical page). For example, a logical unit is associated with a device file or a drive letter (drive name) in an operating system installed in the host computer 3. Each logical unit is assigned a logical unit number (LUN) which is a unique identifier specific to the logical unit. The host computer 3 identifies each logical unit by using the LUN. For example, the LUN is set in a data input/output request transmitted from the host computer 3 to the storage apparatus 10.

The storage apparatus 10 recognizes a physical storage area provided by the physical drive 171 on a logical device (LDEV) basis, the logical device being a storage area logically set by using this physical storage area. Each logical device is assigned, as an identifier, a unique logical device number (LDEV number) specific to the logical device. A storage area of the logical device is configured by controlling, for example, a plurality of pieces of hardware with a RAID (Redundant Arrays of Inexpensive (or Independent) Disks) scheme (at least one of RAID 0 to 6).

Figure 11:
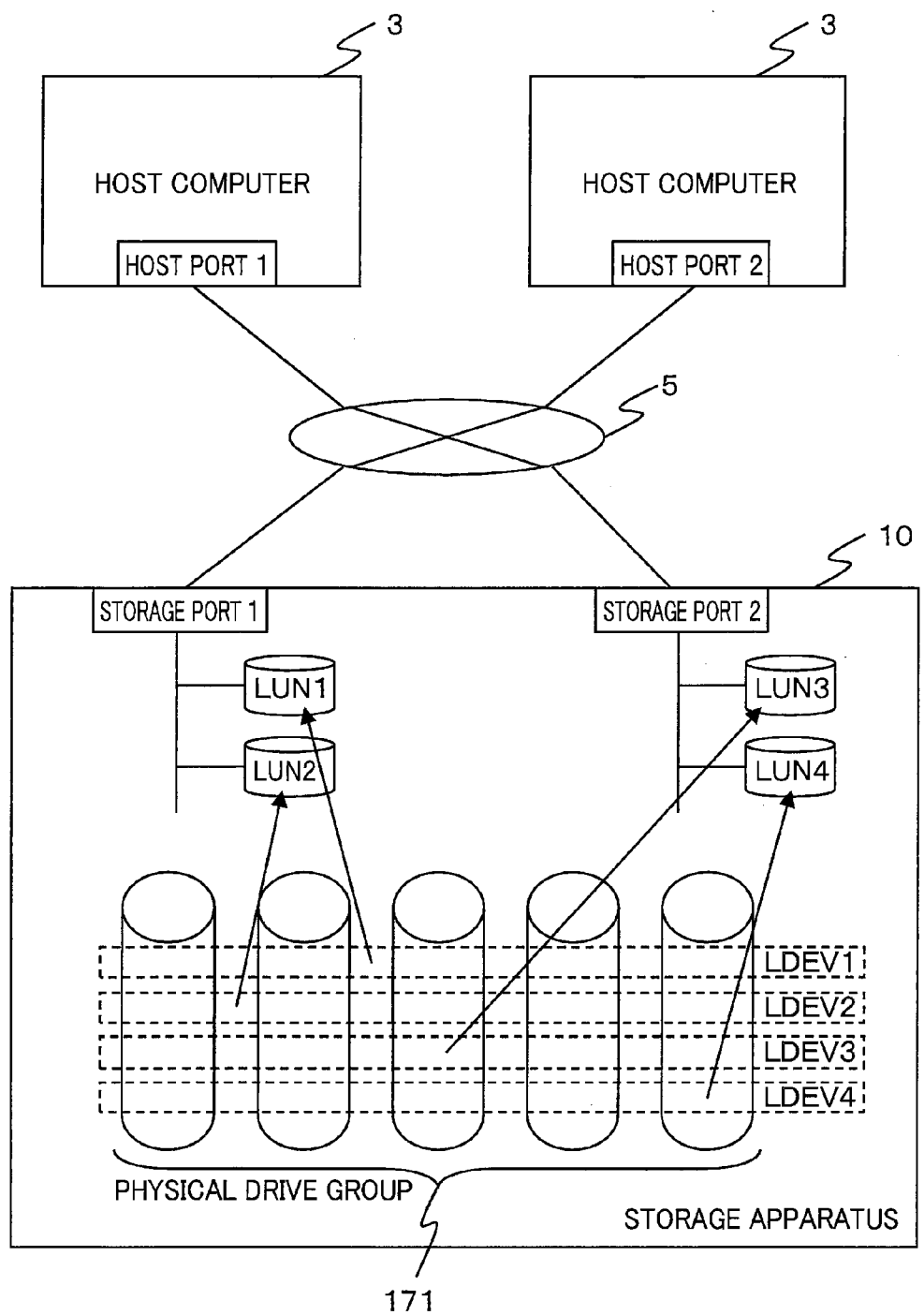
FIG. 11 is a schematic diagram explaining access routes (paths) from the host computers 3 to the storage apparatus 10.

FIG. 11 is a schematic diagram explaining access routes (paths) from the host computer 3 to the storage apparatus 10. As shown in FIG. 11, an access route from the host computer 3 to the storage apparatus 10 can be identified by a combination of a host port ID (host port 1, host port 2, etc.), a storage port ID (storage port 1, storage port 2, etc.), a LUN (LUN1, LUN2, etc.), and an LDEV number (LDEV1, LDEV2, etc.).

Figure 12:
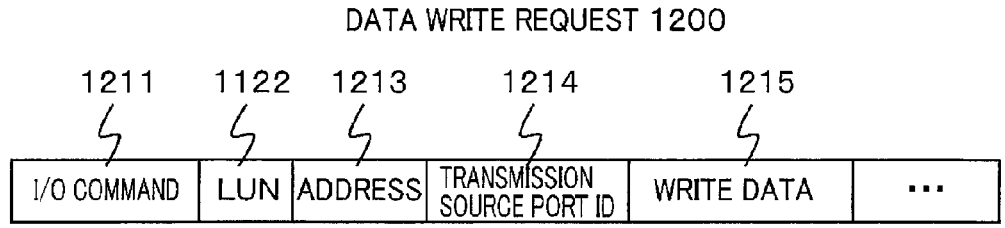
FIG. 12 is an example of a data format for a data write request 1200.

FIG. 12 shows an example of a data format of a data write request 1200 which the host computer 3 transmits to the storage apparatus 10 to write data into the storage device 17 of the storage apparatus 10.

As shown in FIG. 12, the data write request 1200 includes information such as an I/O command 1211, a LUN 1212, an address 1213, a source port ID 1214, and write data 1215.

A command which requests data write into the storage apparatus 10 is set in the I/O command 1211. A LUN of the logical unit into which the data is to be written is set in the LUN 1212. An address which specifies a storage area into which the data is to be written is set in the address 1213. A host port ID assigned to the network I/F 36 of the host computer 3 that has transmitted the request is set in the source port ID 1214. Write data to be written into the storage device 17 according to the relevant request is set in the write data 1215.

Figure 13:
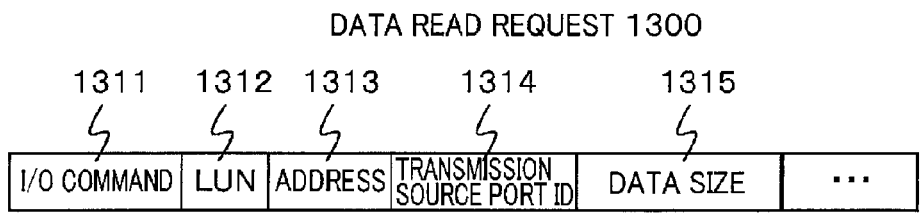
FIG. 13 is an example of a data format for a data read request 1300.

FIG. 13 shows an example of a data format for the data read request 1300 transmitted to the storage apparatus 10 by the host computer 3 when the host computer 3 is to read data from the storage device 17 of the storage apparatus 10.

As shown in FIG. 13, the data read request 1300 includes information such as an I/O command 1311, a LUN 1312, an address 1313, a source port ID 1314, and a data size 1315.

A command which requests data read from the storage apparatus 10 is set in the I/O command 1311. A LUN of the logical unit from which the data is to be read is set in the LUN 1312. An address which specifies the storage area from which the data is to be read is set in the address 1313. A host port ID assigned to the network I/F 36 of the host computer 3 that has transmitted the request is set in the source port ID 1314. A data size of the data to be read from the storage device 17 according to the relevant request is set in the data size 1315.

The host computer 3 of the present embodiment is an apparatus such as a mainframe which manages data in a variable length format, and the data transmitted from the host computer 3 is data in the CKD (Count Key Data architecture) format. Thus, the write data written into the cache memory 14 when the storage apparatus 10 receives the data write request 1200 from the host computer 3, as well as the read data read from the storage device 17 and written into the cache memory 14 when the storage apparatus 10 receives the data read request 1250 from the host computer 3 are both managed as CKD format data.

Figure 14:
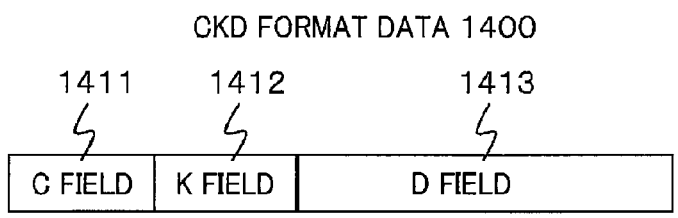
FIG. 14 is an example of a data format for CKD format data 1400.

FIG. 14 shows a data format for data in CKD format (hereinafter referred to as CKD format data 1400). As shown in FIG. 14, the CKD format data 1400 includes three areas (hereinafter also referred to as data sections), i.e., a C field 1411 (Count field) (a first data section), a K field 1412 (Key field) (a second data section), and a D field 1413 (Data field) (a second data section). A single piece of CKD format data 1400 (a set of data (data to be transferred) consisting of one C field 1411, one K field 1412, and one D field 1413) is generated, for example, for every data block which is a management unit of the storage area of the storage device 17.

In the C field 1411 of the three data sections of the CKD format data 1400, there is stored control information such as the block number of the data block as the storage destination of the relevant data, the data length of the K field 1412, and the data length of the D field 1413. In the K field 1412, there is stored information relating to applications that operate on the host computer 3, such as search key information. In the D field 1413, an entity of write data or read data is stored. Note that the C field 1411 has a fixed data length (e.g., 8 bytes), while the K field 1412 and the D field 1413 each have a variable data length.

Figure 15:
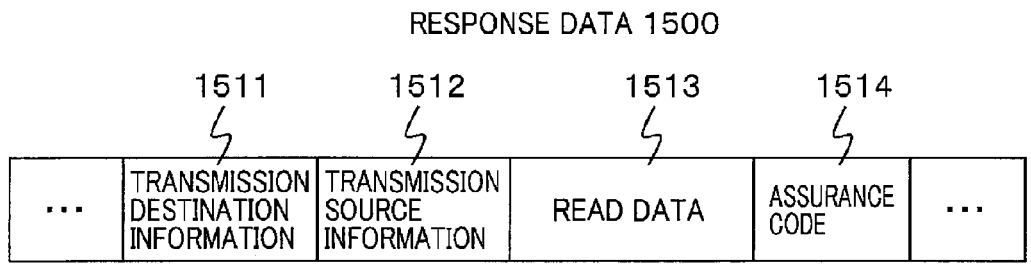
FIG. 15 is an example of a data format for response data 1500.

FIG. 15 is an example of a data format for response data 1500 transmitted when the storage apparatus 10 transmits to the host computer 3 read data as requested by the data read request 1300. As shown in FIG. 15, the response data 1500 includes information such as transmission destination information 1511, transmission source information 1512, read data 1513, and an assurance code 1514.

Information to identify the host computer 3 to which the relevant response data 1500 is to be transmitted (e.g., an identifier of the host computer 3, a network address of the host computer 3, or the like) is set in the transmission destination information 1511. Information to identify the storage apparatus 10 from which the relevant response data 1500 is transmitted (e.g., an identifier of the storage apparatus 10, a network address of the storage apparatus 10, or the like) is set in the transmission source information 1512. Read data read from the storage device 17 is set in the read data 1513. An assurance code (e.g., LRC (Longitudinal Redundancy Check), CRC (Cyclic Redundancy Check) or the like) calculated by the storage apparatus 10 for the read data set in the read data 1513 is set in the assurance code 1514.

Figure 16:
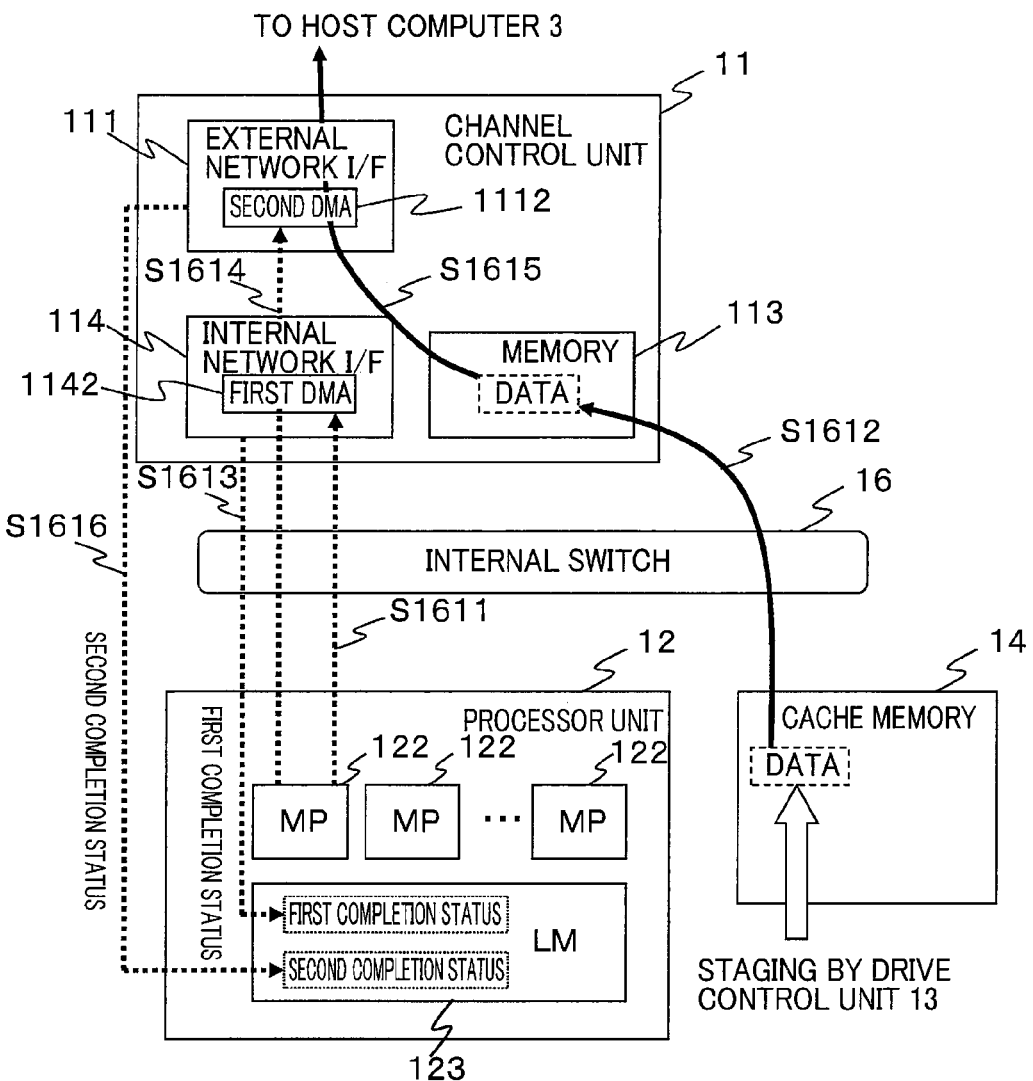
FIG. 16 is a diagram schematically illustrating operations related to a data transfer performed in the storage apparatus 10.

FIG. 16 is a diagram schematically illustrating operations related to a data transfer performed in the storage apparatus 10, specifically, is a diagram illustrating operations performed when the channel control unit 11 reads the data stored in the cache memory 14 and then transmits the data to the host computer 3. Also, FIG. 17 is a flowchart explaining the operations shown in FIG. 16 in more detail.

Figure 17:
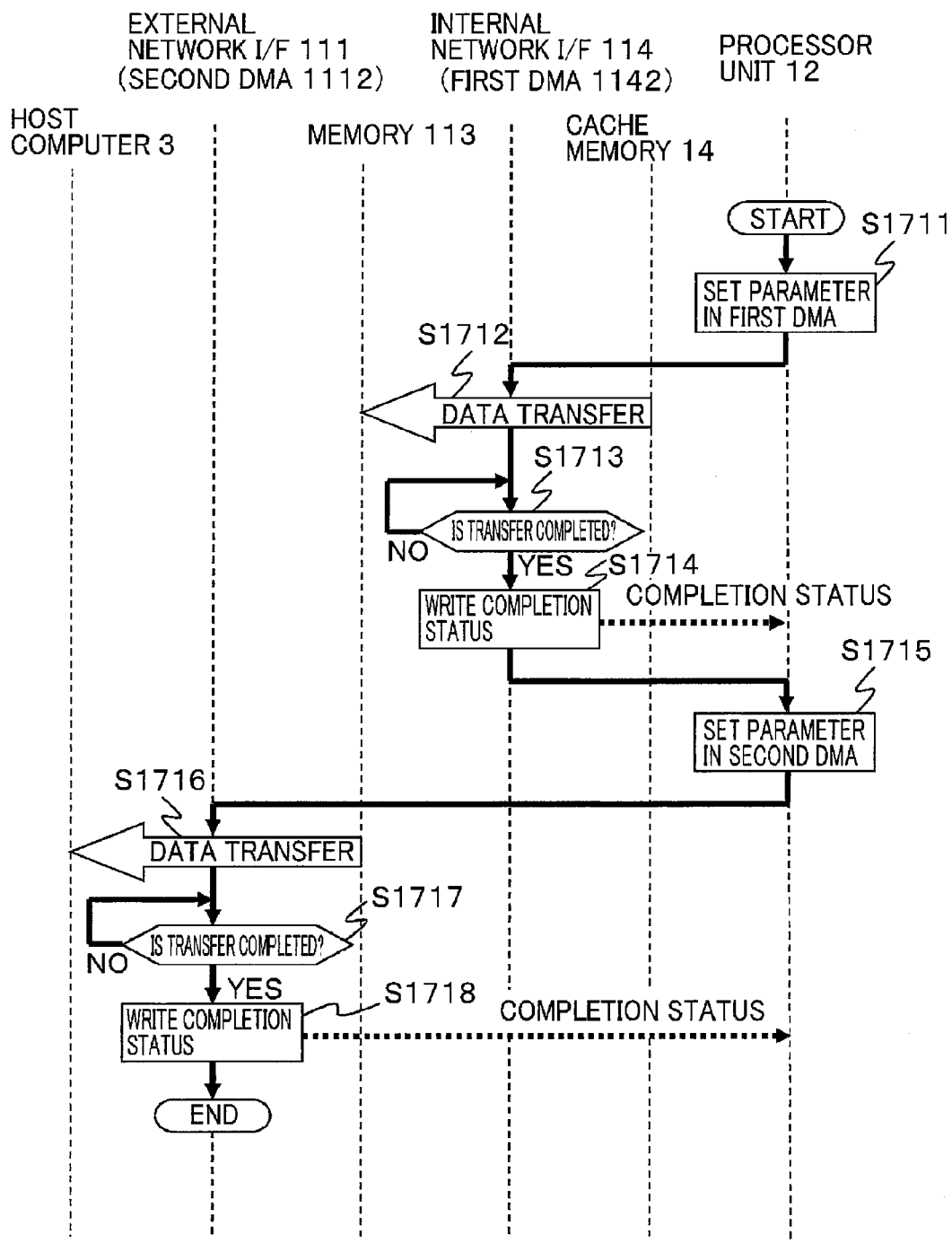
FIG. 17 is a flowchart explaining the operations shown in FIG. 16 in more detail.

The operations shown in FIGS. 16 and 17 are ones, for example, performed in response to the data read request 1300 transmitted from the host computer 3, e.g., ones performed during the processing of S1016 and S1017 in FIG. 10. In the following, the operations are described in conjunction with FIGS. 16 and 17.

At first, the MP 122 of the processor unit 12 sets a data transfer parameter in the first DMA 1142 (hereinafter, this data transfer parameter is referred to as a first DMA transfer parameter 1800) (S1611, S1711). Data to be transferred by use of the first DMA transfer parameter 1800 is, for example, read data staged to the cache memory 14 by the drive control unit 13.

In a case where the above-mentioned operation is performed in response to the data read request 1300 transmitted from the host computer 3, a setting of the first DMA transfer parameter 1800 is repeated as many times as necessary for the data read request 1300. The necessary number of times is, for example, equivalent to the number of CCW (Channel Command Word) included in a CCW chain.

The first DMA transfer parameter 1800 for the first DMA 1142 may be directly set in the first DMA 1142 by the MP 122 in the above described manner. Alternatively, the first DMA transfer parameter 1800 may be transmitted from the MP 122 to the first control device 1141, and then the first control device 1141 having received the first DMA transfer parameter 1800 may set the first DMA transfer parameter 1800 in the first DMA 1142. In other words, the MP 122 may set the first DMA transfer parameter 1800 in the first DMA 1142 via the first control device 1141.

Figure 18:
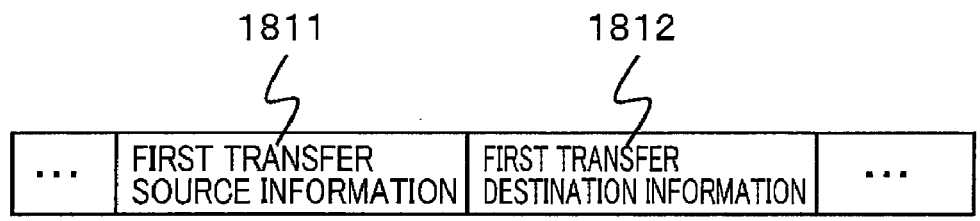
FIG. 18 is a data structure of a first DMA transfer parameter 1800.

FIG. 18 shows a data structure of the first DMA transfer parameter 1800. As shown in FIG. 18, the first DMA transfer parameter 1800 includes first transfer source information 1811, and first transfer destination information 1812.

Information indicating a data transfer source regarding a data transfer by the first DMA 1142 is set in the first transfer source information 1811 of these information pieces. Information indicating a data transfer destination regarding a data transfer by the first DMA 1142 is set in the first transfer destination information 1812.

For example, in a case where the first DMA 1142 transfers data directed from the cache memory 14 to the memory 113, an address of the cache memory 14 is set in the first transfer source information 1811, and an address of the memory 113 is set in the first transfer destination information 1812, respectively. On the other hand, in a case where the first DMA 1142 transfers data directing from the memory 113 to the cache memory 14, an address of the memory 113 is set in the first transfer source information 1811, and an address of the cache memory 14 is set in the first transfer destination information 1812, respectively.

Referring back to FIGS. 16 and 17, the operations are described. When the first DMA transfer parameter 1800 for the first DMA 1142 is set in S1611 (or S1711), the first DMA 1142 starts a data transfer (a transfer of data stored in the cache memory 14 (transfer source device) to the memory 113

(transfer destination device)) according to the first DMA transfer parameter 1800 set (S1612, S1712).

While the data transfer is in progress, the internal network I/F 114 monitors whether the data transfer by the first DMA 1142 is completed or not (S1713). When the data transfer is completed (S1713: YES), the internal network I/F 114 writes a completion status (hereinafter referred to as a first completion status) into the LM 123 of the MP 122 (S1613, S1714). Accordingly, the MP 122 can recognize that the data transfer by the first DMA 1142 has been completed.

When detecting that the first completion status has been written into the LM 123, the processor unit 12 subsequently sets a transfer parameter in the second DMA 1112 (hereinafter the transfer parameter is referred to as a second DMA transfer parameter 1900) (S1614, S1715).

Figure 19:
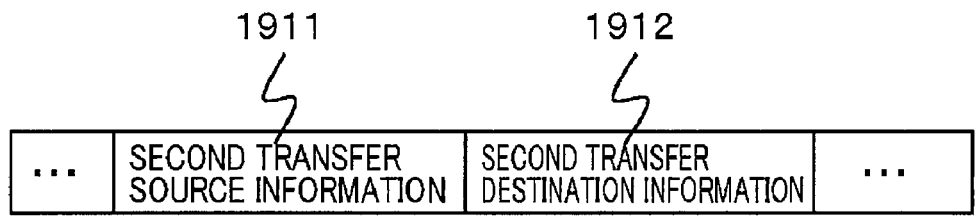
FIG. 19 is a data structure of a second DMA transfer parameter 1900.

FIG. 19 shows a data structure of the second DMA transfer parameter 1900. As shown in FIG. 19, the second DMA transfer parameter 1900 includes second transfer source information 1911 and second transfer destination information 1912. Information indicating a data transfer source regarding a data transfer by the second DMA 1112 is set in the second transfer source information 1911. Information indicating a data transfer destination regarding a data transfer by the second DMA 1112 is set in the second transfer destination information 1912.

For example, in a case where the second DMA 1112 transfers data directing from the memory 113 to the host computer 3, an address of the memory 113 is set in the second transfer source information 1911, and information indicating a data storage location of the transfer destination at the host computer 3 is set in the second transfer destination information 1912, respectively. On the other hand, in a case, for example, where the second DMA 1112 transfers data directing from the host computer 3 to the memory 113, the information indicating the data storage location of the transfer source at the host computer 3 is set in the second transfer source information 1911, and the address of the memory 113 is set in the second transfer destination information 1912, respectively.

Here, the second DMA transfer parameter 1900 for the second DMA 1112 may be directly set in the second DMA 1112 by the internal network I/F 114 in the above described manner. Alternatively, the second DMA transfer parameter 1900 may be transmitted from the second DMA 1112 to the second control device 1111, and then the second control device 1111 having received the second DMA transfer parameter 1900 may set the second DMA transfer parameter 1900 in the second DMA 1112. In other words, the second DMA transfer parameter 1900 may be set in the second DMA 1112 indirectly via the second control device 1111.

When the second DMA transfer parameter 1900 is set, the second DMA 1112 starts a data transfer (a transfer of the data stored in the memory 113 to the host computer 3) according to the second DMA transfer parameter 1900 (S1615, S1716).

While the data transfer is in progress, the external network I/F 111 monitors whether the data transfer by the second DMA 1112 is completed or not (S1717). When the data transfer is completed (S1717: YES), the external network I/F 111 writes a completion status (hereinafter referred to as a second completion status) into the LM 123 of the MP 122 (S1616, S1718).

Figure 20:
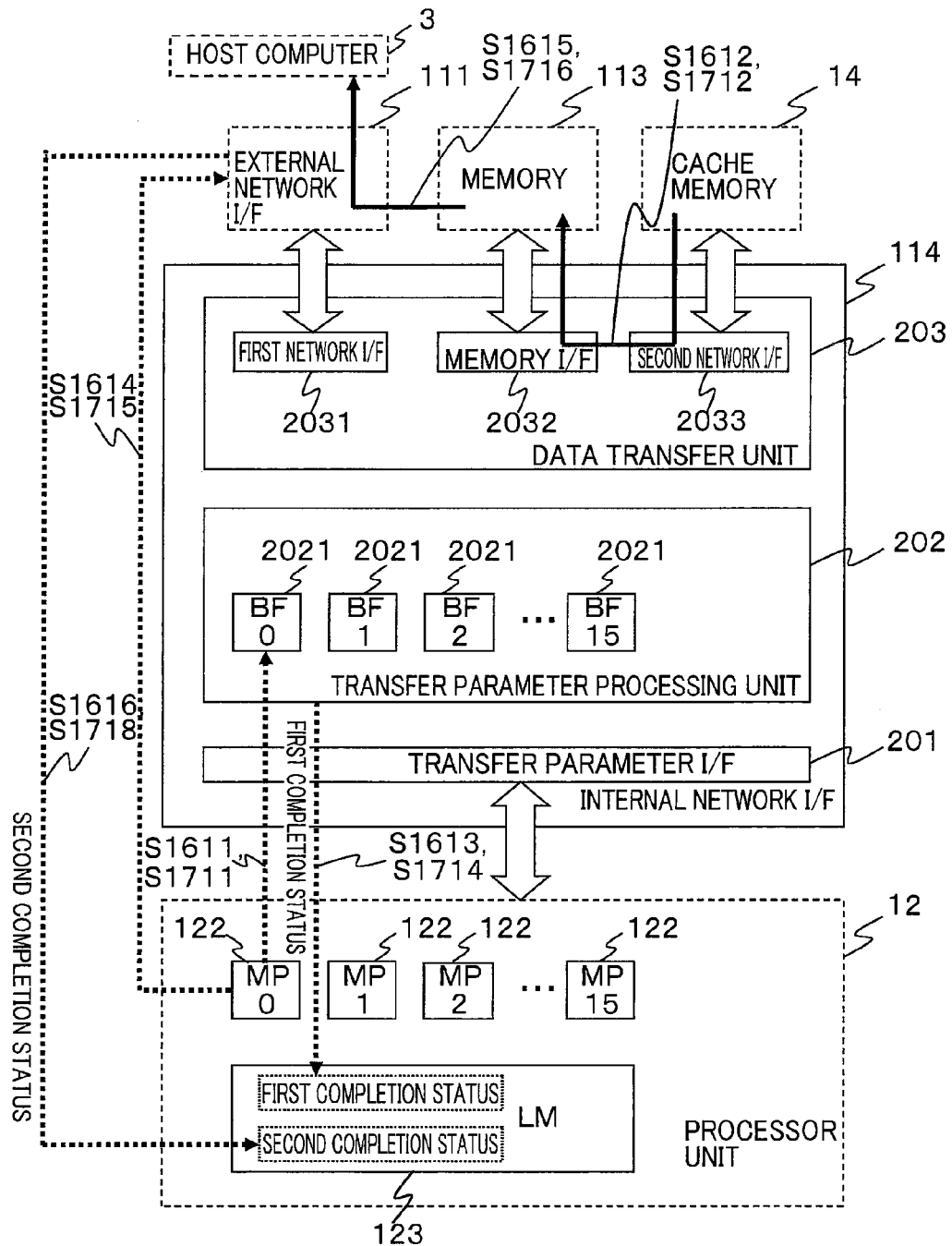
FIG. 20 is a diagram schematically illustrating functions of an internal network I/F 114 in relation to the operations described in conjunction with FIGS. 16 and 17.

FIG. 20 is a diagram schematically illustrating functions of the internal network I/F 114 relating to the operations described in conjunction with FIGS. 16 and 17. In FIG. 20, each reference numeral prefixed with a character "S" indicates the same reference numeral as in FIGS. 16 and 17.

As shown in FIG. 20, the internal network I/F 114 has functions of a transfer parameter I/F 201, a transfer parameter processing part 202, and a data transfer part 203. In addition, the transfer parameter processing part 202 has at least as many number of buffers 2021 (abbreviated as "BF" in FIG. 20) as the number of MPs 122 included in the processor unit 12.

As shown in FIG. 20, the data transfer part 203 includes a first network I/F 2031, a memory I/F 2032, and a second network I/F 2033. These functions are implemented by the hardware included in the internal network I/F 114 or by the first control device 1141 of the internal network I/F 114 reading a program kept in the internal network I/F 114 or the memory 113 and executing the program thus read.

In FIG. 20, the transfer parameter I/F 201 receives the first DMA transfer parameter 1800 transmitted from one of at least one MP 122 included in the processor unit 12, and stores the received first DMA transfer parameter 1800 in the buffer 2021 corresponding to the MP 122 (S1611, S1711).

When the first DMA transfer parameter 1800 is stored in the buffer 2021, the data transfer unit 203 starts a data transfer by use of the memory I/F 2032 and the second network I/F 2033 (a transfer of the data stored in the cache memory 14 to the memory 113) according to the first DMA transfer parameter 1800 (S1612, S1712).

When the data transfer by the first DMA 1142 is completed (S1713: YES), the transfer parameter processing unit 202 writes the first completion status into the LM 123 of the MP 122 (S1613, S1714). Note that, in a case where the processor unit 12 includes a plurality of MPs 122, the transfer parameter processing part 202 writes the first completion status into a storage area of an LM 123 allocated to the MP 122 which has set the first DMA transfer parameter 1800 in S1611 (or S1711).

The processor unit 12 then sets the second DMA transfer parameter 1900 in the second DMA 1112 of the external network I/F 111 to activate the second DMA 1112 (S1614, S1715). The second DMA 1112 starts a data transfer (a transfer of the data stored in the memory 113 to the host computer 3) according to the second DMA transfer parameter 1900 (S1615, S1716).

When the data transfer by the second DMA 1112 is completed (S1717: YES), the external network I/F 111 writes the second completion status into the LM 123 of the MP 122 (S1616, S1718). Note that, in a case where the processor unit 12 includes a plurality of MPs 122, the external network I/F 111 writes the second completion status into the storage area of the LM 123 allocated to the MP 122 which has set the first DMA transfer parameter 1800 in S1611 (S1711).

Figure 21:
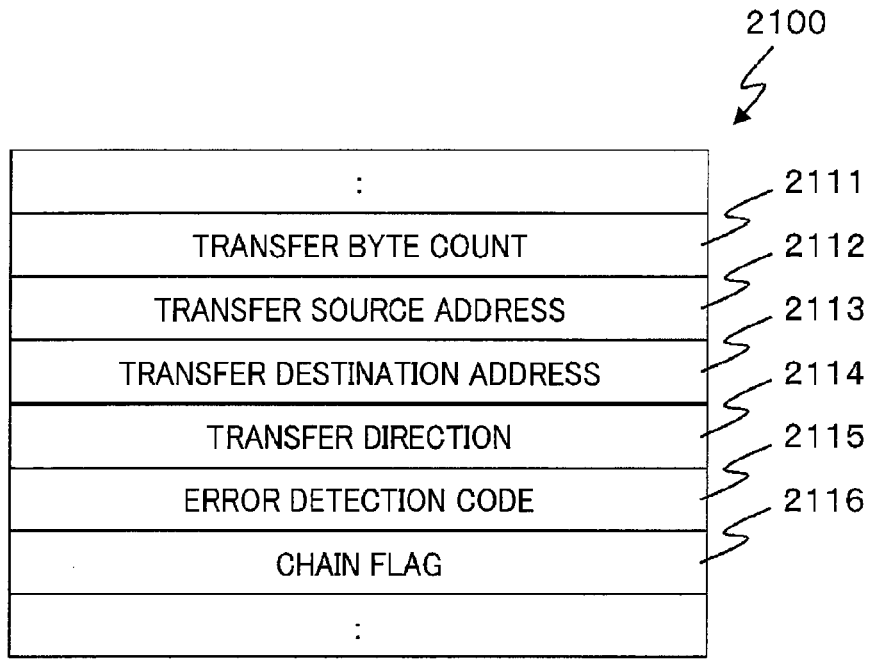
FIG. 21 is an example of a data structure of the first DMA transfer parameter 1800 (or of the second DMA transfer parameter 1900).

FIG. 21 shows an exemplary data structure of the first DMA transfer parameter 1800 (hereinafter the data structure is referred to as data 2100) (the second DMA transfer parameter 1900 is similarly formed as well). As shown in FIG. 21, the data 2100 includes information such as a transfer byte count 2111, a transfer source address 2112, a transfer destination address 2113, a transfer direction 2114, an error detection code 2115, and a chain flag 2116. The data 2100 has a data length of e.g., 10 words (=4 bytes). Note that the data length of the data 2100 is not necessarily limited to this value.

A data length of data to be transferred is set in the transfer byte count 2111. The first transfer source information 1811 or the second transfer source information 1911 is set in the transfer source address 2112. The first transfer destination information 1812 or the second transfer destination information 1912 is set in the transfer destination address 2113.

Information indicating a transfer direction of data is set in the transfer direction 2114, for example, the information indicating whether the data transfer is directed from the cache memory 14 to the memory 113 or whether the data transfer is directed from the memory 113 to the cache memory 14.

An error detection code of the data to be transferred (for example, CRC (Cyclic Redundancy Check) code or LRC (Longitudinal Redundancy Check) code) is set in the error detection code 2115. If an error is detected by the error detection code, the channel control unit 11, for example, stops the data transfer and outputs error information to the maintenance device 18. Information indicating, for example, whether or not there exists a subsequent CCW in a CCW chain is set in the chain flag 2116.

Figure 22:
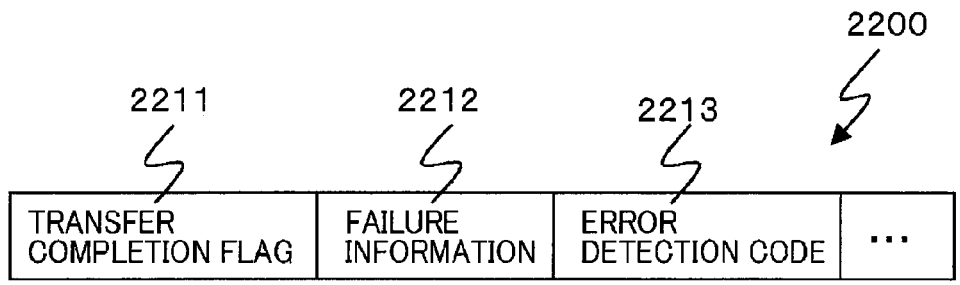
FIG. 22 is an example of a first completion status or a second completion status.

FIG. 22 shows an example of the first completion status or the second completion status (hereinafter referred to as data 2200). As shown in FIG. 22, the data 2200 includes information such as a transfer completion flag 2211, failure information 2212, and an error detection code 2213.

A value indicating whether the data transfer is completed or not is set in the transfer completion flag 2211. Information showing a content of a trouble when a trouble of some kind occurs during data transfer, is set in the failure information 2212. The MP 122 detects whether or not any trouble has occurred at a time of data transfer by referring to the failure information 2212. For example, the content of the error detection code 2115 in FIG. 21 is set as it is in the error detection code 2213. The MP 122 detects whether or not any error has occurred at a time of data transfer by referring to the content of the error detection code 2213.

As described above, read data which is read from the storage device 17 and written into the cache memory 14 when the storage apparatus 10 receives a data read request 1300 from the host computer 3 is managed as the CKD format data 1400 which includes the C field 1411, the K field 1412, and the D field 1413. For this reason, a series of processing steps performed by the first DMA 1142 at the time of data transfer from the cache memory 14 to the memory 113 (the processing of S1611 to S1613 in FIG. 16 or the processing of S1711 to S1714 in FIG. 17) are performed on the assumption that the data to be transferred is in the CKD format data 1400.

In the above-mentioned series of processing steps, for a data transfer of a single piece of CKD format data 1400 from the cache memory 14 to the memory 113, the MP 122 does not generate a first DMA transfer parameter 1800 for transferring the C field 1411, but only generates a first DMA transfer parameter 1800 for transferring the K field 1412 and a first DMA transfer parameter 1800 for transferring the D field 1413.

Figure 23:
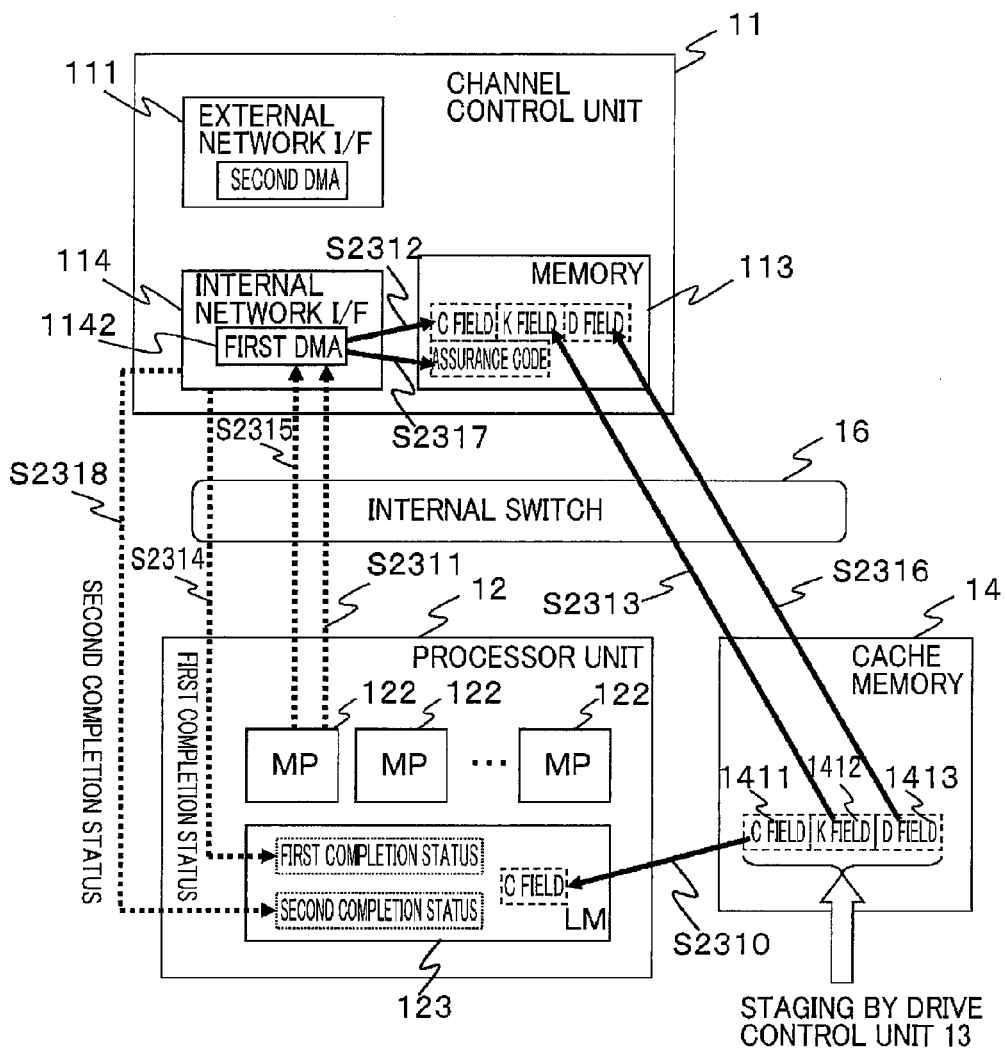
FIG. 23 is a diagram schematically illustrating operations related to a data transfer of the CKD format data 1400.
Figure 24:
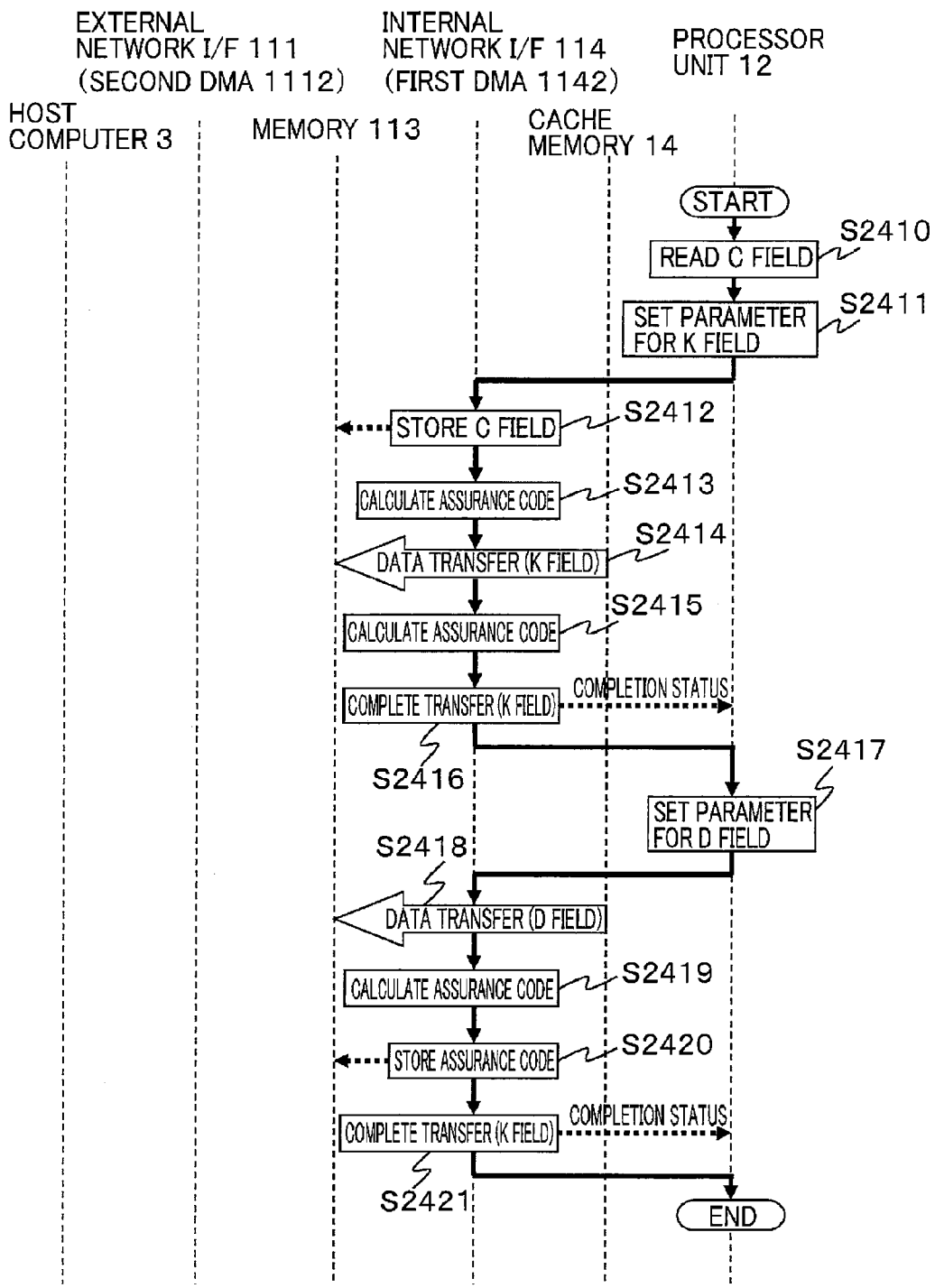
FIG. 24 is a flowchart explaining the operations shown in FIG. 23 in more detail.

FIG. 23 is a diagram schematically illustrating the above-mentioned series of processing steps, and FIG. 24 is a flowchart explaining the above-mentioned series of processing steps in more detail. Description will be given below in conjunction with FIG. 23 and FIG. 24.

At first, the MP 122 of the processor unit 12 reads the C field 1411 of the CKD format data 1400 stored in the cache memory 14 to store the C field 1411 in the LM 123 (S2310, S2410).

The MP 122 then sets the first DMA transfer parameter 1800 in the first DMA 1142, the first DMA transfer parameter 1800 used for transferring the K field 1412, from the cache memory 14 to the memory 113 (S2311, S2411). In this respect, the MP 122 sets the contents of the first transfer source information 1811 and the first transfer destination information 1812 on the basis of the information related to the K field 1412 (the data length, or the like, of the K field 1412) included in the C field 1411 read out from the cache memory 14 to the LM 123.

Figure 25:
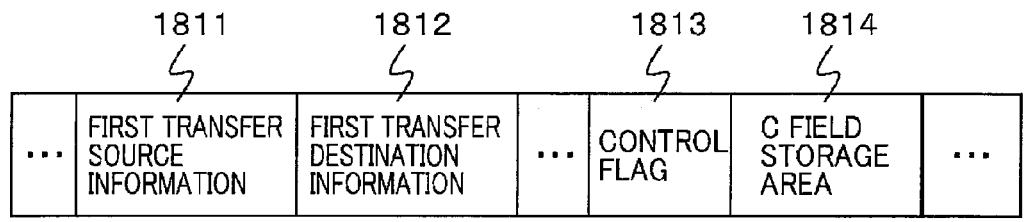
FIG. 25 is another data structure of the first DMA transfer parameter 1800.

FIG. 25 shows another data structure of the first DMA transfer parameter 1800 which is generated by the MP 122 at this point. As shown in FIG. 25, the first DMA transfer parameter 1800 includes a control flag 1813 and a C field storage area 1814 in addition to the above-mentioned first transfer source information 1811 and the first transfer destination information 1812.

Information indicating whether or not the C field 1411 in the C field storage area 1814 of the first DMA transfer parameter 1800 is set in the control flag 1813. Specifically, when the data of the C field 1411 is stored in the C field storage area 1814, the control flag 1813 is set to "1," while when the data of the C field 1411 is not stored in the C field storage area 1814, the control flag 1813 is set to "0."

For generation of the first DMA transfer parameter 1800 for the K field 1412, the MP 122 stores the C field 1411 as it is, which has been read out from the cache memory 14 to the LM 123, into the C field storage area 1814, and sets the control flag 1813 to "1."

In other words, instead of generating a first DMA transfer parameter 1800 for the C field 1411, the MP 122 sets the obtained first DMA transfer parameter 1800 for the K field 1412 in the first DMA 1142 to provide the C field 1411 (the entity of the C field 1411) to the first DMA 1142.

When the setting the first DMA transfer parameter 1800 for the K field 1412 is made in the first DMA 1142 in the above described manner, the first DMA 1142 then stores to the memory 113 the data of the C field 1411 thus set and stored in the C field storage area 1814 of the first DMA transfer parameter 1800 (S2312, S2412). At this point, the first DMA 1142 calculates an assurance code for the data of the C field 1411 and holds the calculated code value (yet-to-be-completed calculation code value, calculation for which is performed up to the C field 1411, of the assurance code for the CKD format data 1400) (S2413).

The first DMA 1142 then performs a data transfer of data of the K field 1412 (a data transfer of the K field 1412 stored in the cache memory 14 to the memory 113) according to the set first DMA transfer parameter 1800 (S2313, S2414). In addition, at this point, the first DMA 1142 calculates an assurance code on the basis of the K field 1412 and the assurance code held in S2413 (by taking over the assurance code held in S2413), and holds the calculated code value (yet-to-be-completed calculation code value, calculation for which is performed up to the K field 1412, of the assurance code for the CKD format data 1400) (S2415).

When the data transfer is completed, the first DMA 1142 writes the first completion status of the data transfer of the K field 1412, into the LM 123 of the MP 122 (S2314, S2416). In this regard, the MP 122 can recognize that the data transfer of the C field 1411 and the K field 1412 has been completed by the event that the first completion status of the data transfer of the K field 1412 has been written into the LM 123.

After detecting that the first completion status of the data transfer of the K field 1412 has been written into the LM 123, the MP 122 then sets the first DMA transfer parameter 1800 in the first DMA 1142, the first DMA transfer parameter 1800 for transferring the D field 1413 from the cache memory 14 to the memory 113 (S2315, S2417). Here, the MP 122 sets the contents of the first transfer source information 1811 and the first transfer destination information 1812 on the basis of the information related to the D field 1413 (the data length, and the like, of the D field 1413) included in the C field 1411 which has been read out from the cache memory 14 to the LM 123.

At this point, unlike the case of the first DMA transfer parameter 1800 for the K field 1412, the control flag 1813 of the first DMA transfer parameter 1800 for the D field 1413 is set to "0" (the C field storage area 1814 of the first DMA transfer parameter 1800 for the D field 1413 is not used).

When the setting of the first DMA transfer parameter 1800 for the D field 1413 is made, the first DMA 1142 then performs a data transfer of the D field 1413 (a transfer of the data stored in the cache memory 14 to the memory 113) according to the first DMA transfer parameter 1800 (S2316, S2418). In addition, at this point, the first DMA 1142 calculates an assurance code on the basis of the data of the D field 1413 and the assurance code held in S2415 (by taking over the assurance code held in S2415) (S2319).

When the data transfer is completed, the first DMA 1142 stores the calculated code value at a predetermined location in the memory 113 as an assurance code for the entire the CKD format data 1400 (S2317, S2420). As such, the first DMA 1142 stores data in the memory 113 while keeping the calculation order of the assurance codes (the assurance code for the C field 1411 is calculated, then the assurance code for the K field 1412 is calculated, and thereafter the assurance code for the D field 1413 is calculated). For this reason, the first DMA 1142 can provide a correct assurance code to the host computer 3. Note that the assurance code stored in the memory 113 is stored in the area of the assurance code 1514 in the response data 1500 shown in FIG. 15, and is transmitted to the host computer 3 along with the read data 1513.

The first DMA 1142 then writes a second completion status of the data transfer of the D field 1413, into the LM 123 of the MP 122 (S2318, S2421). Note that the MP 122 can recognize that the data transfer of the CKD format data 1400 (all of the C field 1411, the K field 1412, and the D field 1413) has been completed by the event that the second completion status of the data transfer of the D field 1413 has been written into the LM 123.

Figure 26:
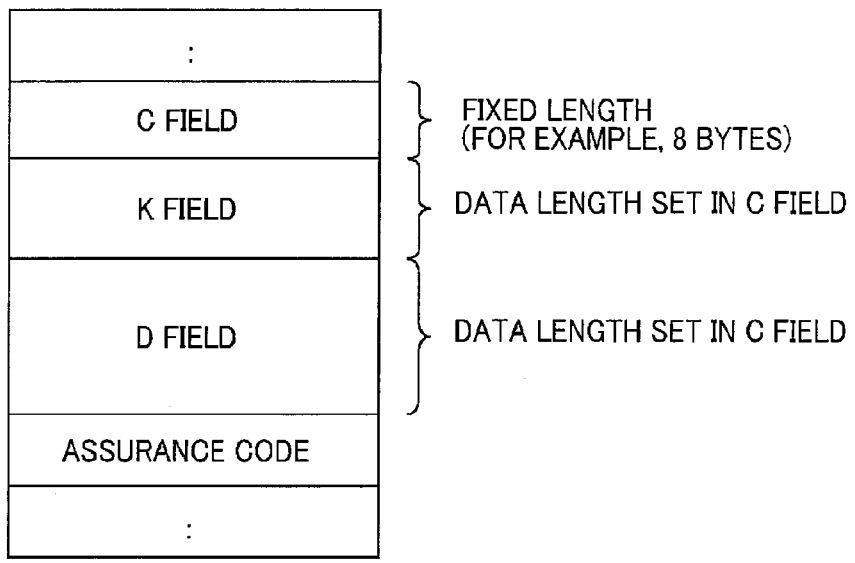
FIG. 26 is an example of how the CKD format data 1400 is stored in the memory 113.
Figure 27:
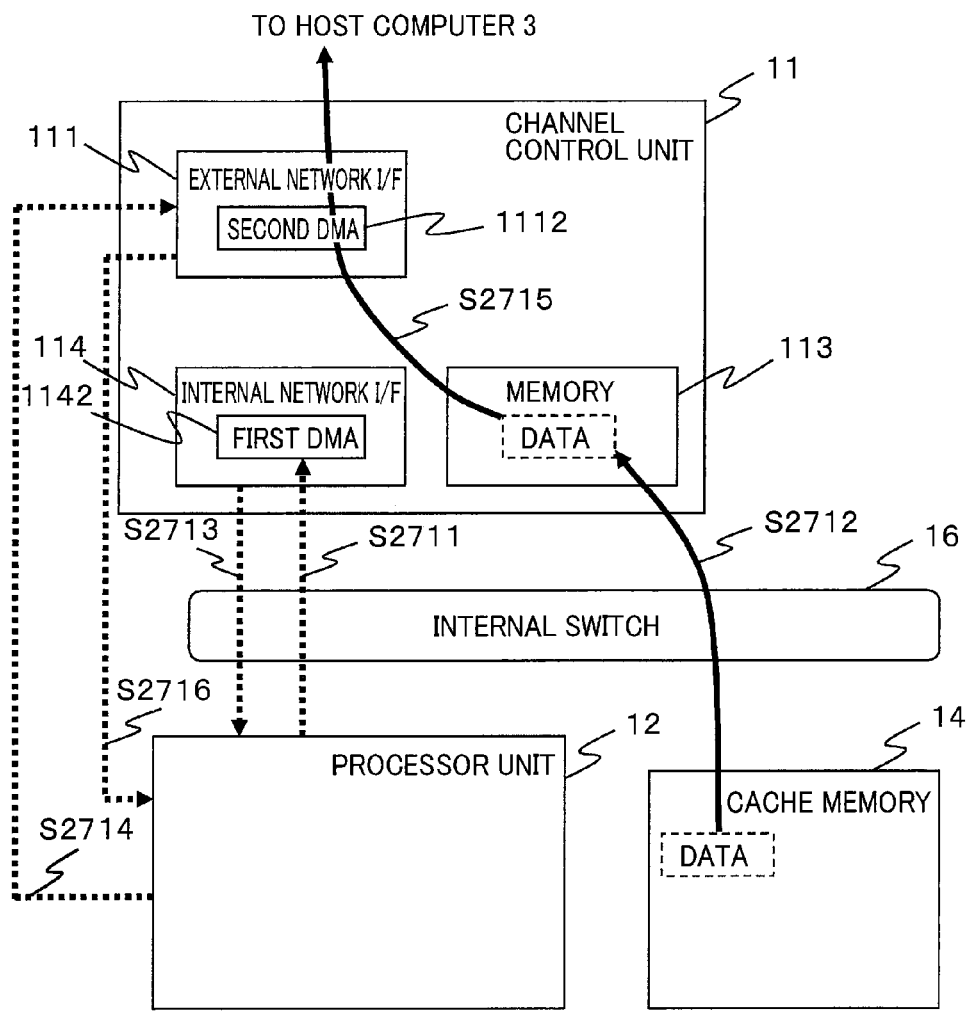
FIG. 27 is an example of a hardware configuration of the storage apparatus 10.
Figure 28:
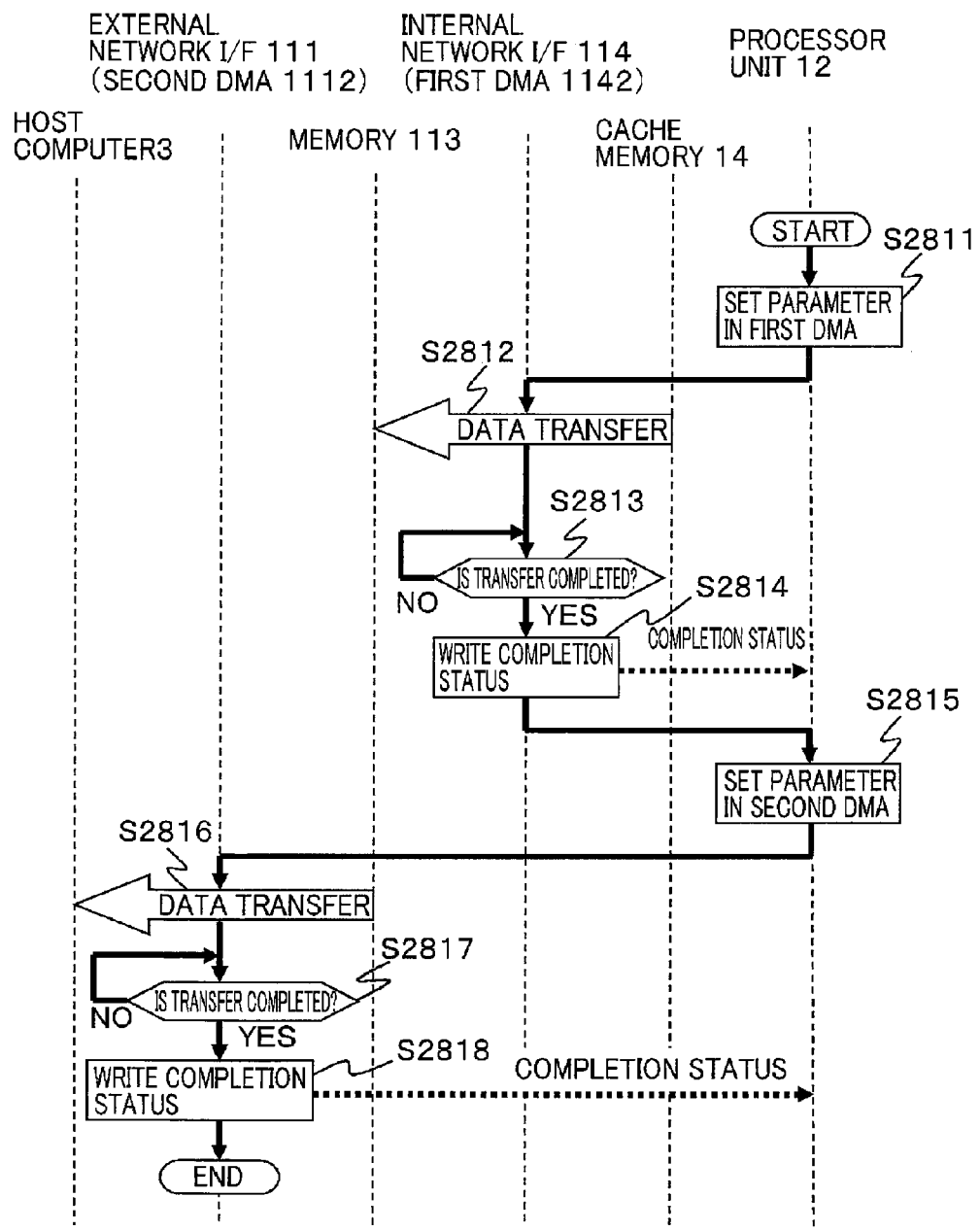
FIG. 28 is a diagram explaining operations related to a data transfer performed in the storage apparatus 10.
Figure 29:
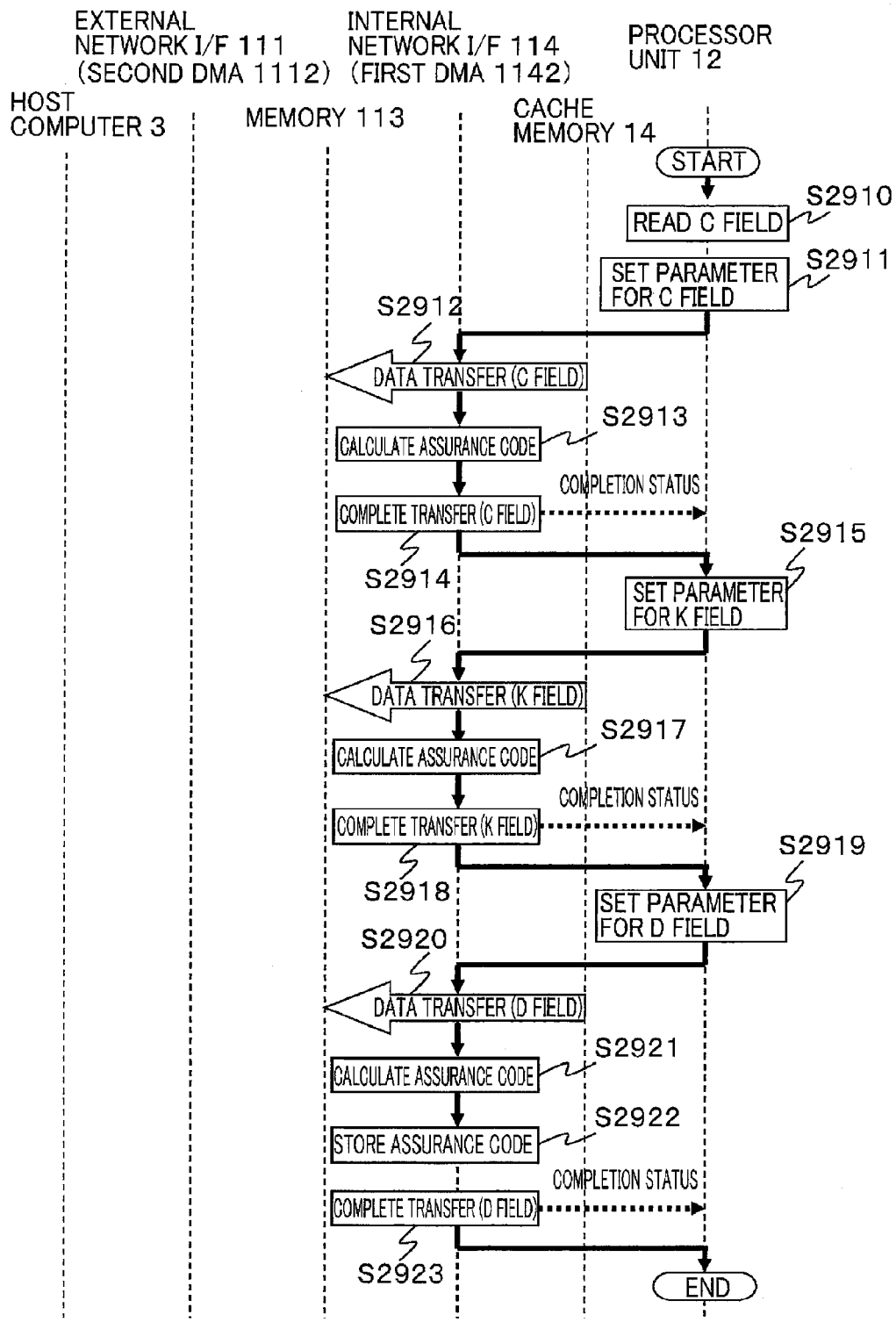
FIG. 29 is a diagram schematically illustrating operations related to a data transfer of the CKD format data 1400.

FIG. 26 is an example of how the CKD format data 1400 is stored in the memory 113. Here, consider a case of storing, in S2312 (or in S2412), the data of the K field 1412 transferred in S2313 (or S2414) in the memory 113 so that the data of the K field 1412 is contiguous to the storage area for the C field 1411 previously stored in the memory 113. In this case, the K field 1412 may be stored in a way that a position which is shifted by the data length of the C field 1411 from the top address of the storage area for the C field is set as the top address for the K field.

As described above, when performing a data transfer of the CKD format data 1400 from the cache memory 14 to the memory 113, the MP 122 does not generate a first DMA transfer parameter 1800 for transferring the C field 1411. Instead, the MP 122 generates a first DMA transfer parameter 1800 for transferring the K field 1412, including data of the C field 1411. The MP 122 also generates a first DMA transfer parameter 1800 for transferring the D field 1413, and sets both the first DMA transfer parameters 1800 in the first DMA 1142. The first DMA 1142 then retrieves the C field 1411 included in the first DMA transfer parameter 1800 thus set and stores the C field 1411 to the memory 113.

In this approach, the MP 122 does not generate the first DMA transfer parameter 1800 for transferring the C field 1411, and accordingly sets the transfer parameters less frequently. For this reason, the load on the MP122 for generating and setting the first DMA transfer parameter 1800 for transferring the C field 1411 among the entire CKD format data 1400 is reduced. Moreover, since the data transfer of the C field 1411 is performed by use of the first DMA transfer parameter 1800 for the K field 1412, only the data transfer of the K field 1412 and the data transfer of the D filed 1413 are performed by use of the data transfer function of the first DMA 1142. The load on the first DMA 1142 is reduced with the decrease in frequency of data transfer by the first DMA 1142. This consequently leads to a reduction in total time required for a data transfer of the entire CKD format data 1400. Further, by implementing the first DMA 1142 that operates as a calculation object for an assurance code to the first DMA transfer parameter 1800 (C field 1411) of the K field 1412, allows generation of an assurance code where a data within the parameter is contiguous to a succeeding data so that a correct assurance code can be provided to the host computer 3.

The above embodiment allows a high-speed data transfer of data stored in the cache memory 14 to the host computer 3, even in a case where there is a long communication distance between a component that activates a data transfer (the processor unit 12) and a component that is activated (the first DMA 1142). Thus, the storage apparatus 10 can produce better throughput and exert a better response performance to the host computer 3.

In the above, a preferable embodiment of the present invention has been described. The embodiment, however, is provided for exemplary purpose to describe the present invention, and is not intended to limit the scope of the present invention only to this embodiment. The present invention may be implemented in various other embodiments.

The invention claimed is:

1. A data transfer system comprising:
a first data transfer device communicatively coupled to a transfer source device and a transfer destination device; and
a transfer parameter setting device configured to set a transfer parameter in the first data transfer device; wherein:
at a time the transfer parameter setting device transfers a transfer target data including a first data section and at least one second data section from the transfer source device to the transfer destination device, the first data section containing information used for setting the transfer parameter of the second data section, the transfer parameter setting device acquires the first data section from the transfer source device, and sets the transfer parameter in the first data transfer device on the basis of the acquired first data section,
the transfer parameter having attached thereto the first data section and being for transferring the second data section from the transfer source device to the transfer destination device, and
the first data transfer device stores the first data section attached to the transfer parameter, in the transfer destination device, and transfers the transfer target data from the transfer source device to the transfer destination device by transferring the second data section from the transfer source device to the transfer destination device according to the transfer parameter,
wherein the transfer parameter is configured as a calculation object of an assurance code.

2. The data transfer system according to claim 1, wherein:
the first data transfer device is configured to:
calculate an assurance code for the first data section,
take over the calculated assurance code for the first data section to calculate an assurance code for the second data section, and
attach the calculated assurance code to the first data section and the second data section to be stored in the transfer destination device;
the data transfer system includes:
a channel control unit to communicate with a host computer, a drive control unit to communicate with a storage device, a cache memory, a processor unit to perform data transfer between the channel control unit, the drive control unit, and the cache memory, and an internal switch to communicatively couple the channel control unit and the processor unit;

the transfer destination device is a memory included in the channel control unit; the transfer source device is the cache memory;

the transfer parameter setting device is a microprocessor included in the processor unit;

the transfer target data is CKD (Count Key Data architecture) format data including a C field as the first data section, and a K field and a D field as the second data section;

the C field includes a data length of the K field and a data length of the D field as information used at a time the transfer parameter of the second data section is set;

the data transfer system further includes a second data transfer device that is communicatively coupled to the host computer, the memory included in the channel control unit, and the first data transfer device, receives the transfer parameter set by the transfer parameter setting device, and transfers to the host computer the transfer target data stored in the memory according to the received transfer parameter;

the processor unit includes a memory and a plurality of the microprocessors;

the first data transfer device, after completing the data transfer, writes a first completion status of the data transfer into a storage area in the memory allocated to the microprocessor which has set the transfer parameter;

the second data transfer device, after completing the data transfer, writes a second completion status of the data transfer into a storage area in the memory allocated to the microprocessor which has set the transfer parameter;

the first data transfer device includes a first DMA (Direct Memory Access) that performs the data transfer according to the transfer parameter; and the second data transfer device includes a second DMA that performs the data transfer according to the transfer parameter.

3. The data transfer system according to claim 1, wherein the first data transfer device is configured to:

calculate an assurance code for the first data section, take over the calculated first assurance code for the first data section to calculate an assurance code for the second data section, and attach the calculated assurance code to the first data section and the second data section to be stored in the transfer destination device.

4. The data transfer system according to claim 1, further comprising:

a channel control unit to communicate with a host computer;

a drive control unit to communicate with a storage device;

a cache memory; a processor unit to perform data transfer between the channel control unit, the drive control unit, and the cache memory; and an internal switch to communicatively couple the channel control unit and the processor unit, wherein the transfer destination device is a memory included in the channel control unit; wherein:

the transfer source device is the cache memory; and the transfer parameter setting device is a microprocessor included in the processor unit.

5. The data transfer system according to claim 4, wherein:

the transfer target data is CKD (Count Key Data architecture) format data including a C field as the first data section, and a K field and a D field as the second data section; and the C field includes a data length of the K field and a data length of the D field as information used at a time the transfer parameter of the second data section is set.

6. The data transfer system according to claim 4, further comprising a second data transfer device that is communicatively coupled to the host computer, the memory included in the channel control unit, and the first data transfer device, receives the transfer parameter set by the transfer parameter setting device, and transfers to the host computer the transfer target data stored in the memory according to the received transfer parameter.

7. The data transfer system according to claim 6, wherein:

the processor unit includes a memory and a plurality of the microprocessors;

the first data transfer device, after completing the data transfer, writes a first completion status of the data transfer into a storage area in the memory allocated to the microprocessor which has set the transfer parameter; and the second data transfer device after completing the data transfer, writes a second completion status of the data transfer into a storage area in the memory allocated to the microprocessor which has set the transfer parameter.

8. The data transfer system according to claim 6, wherein:

the first data transfer device includes a first DMA (Direct Memory Access) configured to perform the data transfer according to the transfer parameter; and the second data transfer device includes a second DMA configured to perform the data transfer according to the transfer parameter.

9. A data transfer method by a data transfer system including a first data transfer device communicatively coupled to a transfer source device, a transfer destination device, and a transfer parameter setting device configured to set a transfer parameter in the first data transfer device, wherein:

at a time the transfer parameter setting device transfers a transfer target data including a first data section and at least one second data section from the transfer source device to the transfer destination device, the first data section containing information used for setting the transfer parameter of the second data section, the transfer parameter setting device acquires the first data section from the transfer source device and sets the transfer parameter in the first data transfer device on the basis of the acquired first data section, the transfer parameter having attached thereto the first data section and being for transferring the second data section from the transfer source device to the transfer destination device; and the first data transfer device stores the first data section attached to the transfer parameter, in the transfer destination device, and transfers the transfer target data from the transfer source device to the transfer destination device by transferring the second data section from the transfer source device to the transfer destination device according to the transfer parameter, wherein the transfer parameter is configured as a calculation object of an assurance code.

10. The data transfer method according to claim 9, wherein the first data transfer device is configured to:

calculate an assurance code for the first data section, take over the calculated assurance code for the first data section to calculate an assurance code for the second data section, and attach the calculated assurance code to the first data section and the second data section to be stored in the transfer destination device.

11. The data transfer method according to claim 9, wherein the data transfer system further includes:

a channel control unit to communicate with a host computer;

a drive control unit to communicate with a storage device;

a cache memory;

a processor unit to perform data transfer between the channel control unit, the drive control unit, and the cache memory; and an internal switch to communicatively couple the channel control unit and the processor unit; wherein:

the transfer destination device is a memory included in the channel control unit; the transfer source device is the cache memory; and the transfer parameter setting device is a microprocessor included in the processor unit.

12. The data transfer method according to claim 11, wherein:

the transfer target data is CKD (Count Key Data architecture) format data including a C field as the first data section, and a K field and a D field as the second data section; and the C field includes a data length of the K field and a data length of the D field as information used at a time the transfer parameter of the second data section is set.

* * * * *